United States Patent
Hallamask et al.

(10) Patent No.: US 9,214,022 B1
(45) Date of Patent: Dec. 15, 2015

(54) ENHANCED ACCURACY FOR TRACKING TETHERED AIRBORNE VEHICLES

(71) Applicant: Google Inc., Mountain View, CA (US)

(72) Inventors: Kurt Hallamask, San Carlos, CA (US); Brian Hachtmann, San Martin, CA (US); Rob Nelson, Alameda, CA (US); Corwin Hardham, Mountain View, CA (US); Kenny Jensen, Berkeley, CA (US); Elias Wolfgang Patten, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/325,187

(22) Filed: Jul. 7, 2014

(51) Int. Cl.
| | | |
|---|---|---|
| *B64F 3/00* | (2006.01) | |
| *B64F 3/02* | (2006.01) | |
| *G06T 7/00* | (2006.01) | |
| *B64F 1/02* | (2006.01) | |
| *B64C 39/02* | (2006.01) | |

(52) U.S. Cl.
CPC ............ *G06T 7/004* (2013.01); *B64C 39/022* (2013.01); *B64F 1/02* (2013.01); *B64F 3/00* (2013.01); *B64F 3/02* (2013.01)

(58) Field of Classification Search
CPC .......... B64F 3/00; B64F 3/02; B64C 39/022; A63H 27/04; F42B 15/04; F41G 7/32
See application file for complete search history.

(56) References Cited

U.S. PATENT DOCUMENTS

| | | | |
|---|---|---|---|
| 4,152,933 A | | 5/1979 | Woodhouse |
| 5,005,930 A | * | 4/1991 | Schotter ................. F42B 15/04 244/3.12 |
| 5,106,033 A | * | 4/1992 | Phan ........................ F41G 7/32 244/3.12 |
| 5,115,997 A | | 5/1992 | Peterson |
| 5,722,618 A | | 3/1998 | Jacobs et al. |
| 8,320,616 B2 | | 11/2012 | Kaiser et al. |
| 2010/0032948 A1 | | 2/2010 | Bevirt |
| 2010/0295303 A1 | | 11/2010 | Lind et al. |
| 2013/0134261 A1 | | 5/2013 | Goldstein |
| 2013/0221679 A1 | | 8/2013 | Vander Lind |

FOREIGN PATENT DOCUMENTS

| | | | | |
|---|---|---|---|---|
| KR | 20140066850 A1 | | 6/2014 | |
| WO | WO 2014203593 A1 | * | 12/2014 | ............ B64C 39/022 |

* cited by examiner

*Primary Examiner* — Tien Dinh
*Assistant Examiner* — Richard R Green
(74) *Attorney, Agent, or Firm* — McDonnell Boehnen Hulbert & Berghoff LLP

(57) ABSTRACT

Wind energy systems, such as an Airborne Wind Turbine ("AWT"), may be used to facilitate conversion of kinetic energy to electrical energy. An AWT may include an aerial vehicle that flies in a path to convert kinetic wind energy to electrical energy. The aerial vehicle may be tethered to a ground station with a tether that terminates at a tether termination mount system. In one aspect, the tether termination mount system may include a tether termination unit configured in one or more gimbals that allow for the tether termination unit to rotate about one or more axes while tracking the aerial vehicle in flight. In a further aspect, the tether termination mount system may include an imaging device configured for imaging the aerial vehicle during flight in order to enhance tracking accuracy over that which is performed by angular motion of the tether termination unit.

40 Claims, 10 Drawing Sheets

US 9,214,022 B1

ENHANCED ACCURACY FOR TRACKING TETHERED AIRBORNE VEHICLES

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

In one aspect, an apparatus includes: a tether termination mount system comprising a tether termination unit configured for rotation about a first axis of rotation and a second axis of rotation, the first and second axes of rotation being oriented at an angle to one another; a tether configured for coupling an aerial vehicle to the tether termination mount system, the tether having a proximal end emanating from the tether termination unit along a pointing axis of the tether termination unit and distal end attached to the aerial vehicle, wherein the pointing axis is configured for tracking angular motion of the proximal end of the tether induced by flight motion of the aerial vehicle; an imaging device attached to the tether termination unit and having an image plane oriented at a fixed angle with respect to the pointing axis, and a reference point in the image plane corresponding to the pointing axis direction in a field-of-view (FOV) of the image plane; and a vehicle tracking subsystem configured for tracking a location of the aerial vehicle with respect to the tether termination mount system during tethered flight of the aerial vehicle by (i) determining the pointing axis direction as a function of measured rotation angles of the tether termination unit about the first and second axes of rotation, (ii) determining an angular offset between an image of the aerial vehicle in the image plane and the reference point in the image plane, and (iii) applying the determined angular offset as a correction to the determined pointing axis direction.

In another aspect, a method involves: determining a pointing direction of a pointing axis of a tether termination unit as a function of measured rotation angles of the tether termination unit about a first axis of rotation and a second axis of rotation, wherein the tether termination unit is configured for terminating a proximal end of a tether that is coupled at a distal end with an aerial vehicle, and wherein the pointing axis is configured for tracking angular motion of the proximal end of the tether induced by flight motion of the aerial vehicle; determining an angular offset between an image of the aerial vehicle in flight in an image plane of an imaging device attached to the tether termination unit and a reference point in the image plane, wherein the image plane is configured at a fixed angle with respect to the pointing axis, and the reference point corresponds to the pointing axis direction in a field-of-view (FOV) of the image plane; and determining a location of the aerial vehicle in flight with respect to the tether termination unit by applying the determined angular offset as a correction to the determined pointing axis direction.

In yet another aspect, a non-transient computer-readable storage medium have instructions stored therein, that when executed by one or more processors of an apparatus comprising a tether termination unit, cause the apparatus to perform functions including: determining a pointing direction of a pointing axis of the tether termination unit as a function of measured rotation angles of the tether termination unit about a first axis of rotation and a second axis of rotation, wherein the tether termination unit is configured for terminating a proximal end of a tether that is coupled at a distal end with an aerial vehicle, and wherein the pointing axis is configured for tracking angular motion of the proximal end of the tether induced by flight motion of the aerial vehicle; determining an angular offset between an image of the aerial vehicle in flight in an image plane of an imaging device attached to the tether termination unit and a reference point in the image plane, wherein the image plane is configured at a fixed angle with respect to the pointing axis, and the reference point corresponds to the pointing axis direction in a field-of-view (FOV) of the image plane; and determining a location of the aerial vehicle in flight with respect to the tether termination unit by applying the determined angular offset as a correction to the determined pointing axis direction.

These as well as other aspects, advantages, and alternatives, will become apparent to those of ordinary skill in the art by reading the following detailed description, with reference where appropriate to the accompanying drawings.

DETAILED DESCRIPTION

Figure 1:
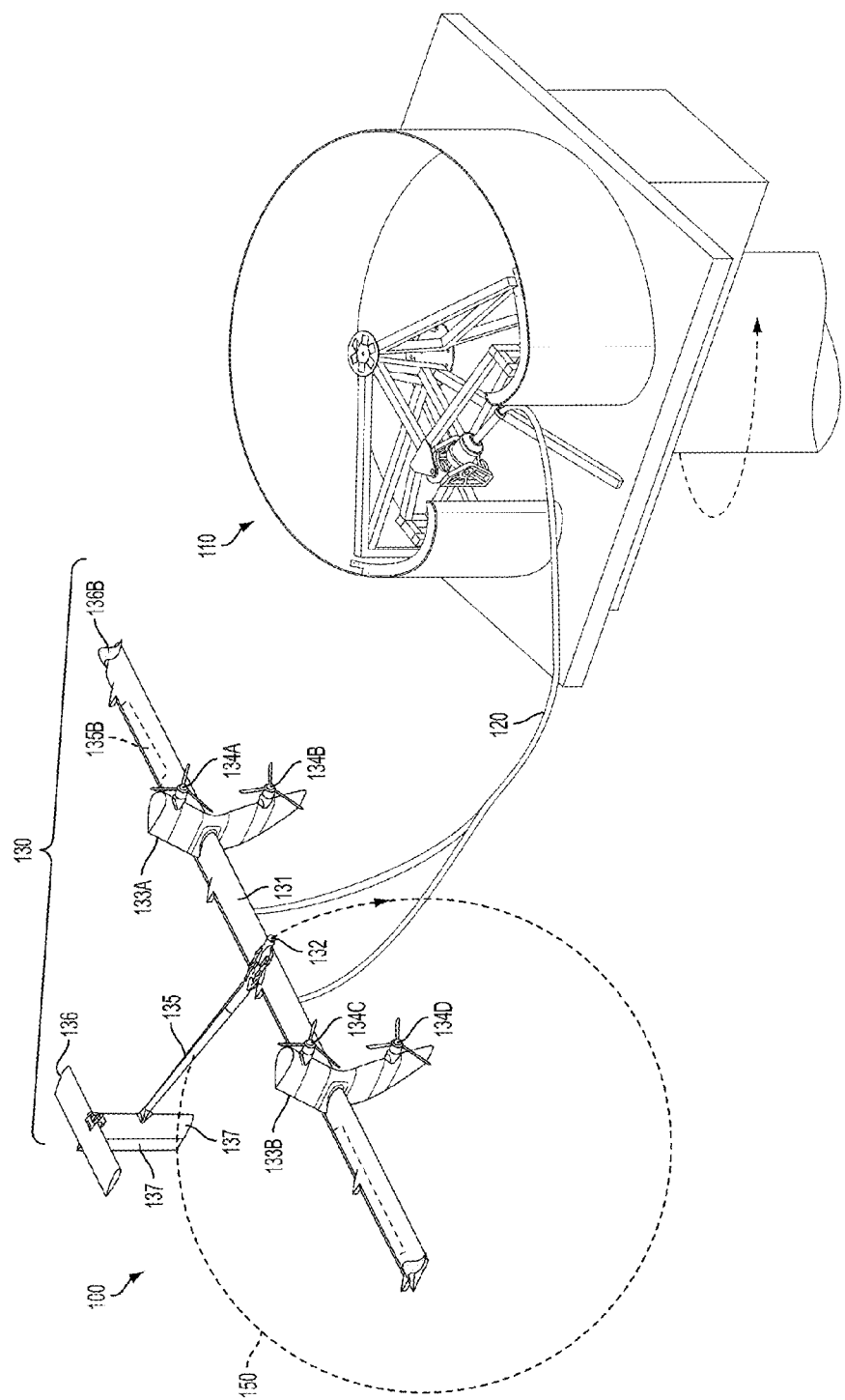
FIG. 1 illustrates an Airborne Wind Turbine (AWT), according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. OVERVIEW

Example embodiments relate to aerial vehicles, which may be used in a wind energy system, such as an Airborne Wind Turbine (AWT) system. In particular, example embodiments may relate to, or take the form of, methods and systems for facilitating an aerial vehicle in the process of conversion of kinetic energy to electrical energy. As used herein, the term "aerial vehicle" generally refers to a type of vehicle that is capable of, or configured for flight, and does not necessarily refer to an operational state in which such a vehicle is in flight. The operational state of an aerial vehicle may be specified herein explicitly, such as in a "flying aerial vehicle" or "an aerial vehicle in flight," although in some instances of the discussion herein, the operational state may be apparent or implicit from context.

An AWT system (or just AWT for short) may include an aerial vehicle configured for flying in a path, such as a substantially circular path, while converting kinetic wind energy to electrical energy via onboard turbines. In an example embodiment, the aerial vehicle may be connected to a ground station via a tether. While tethered, the aerial vehicle may: (i) fly at a range of elevations and substantially along the path, and return to the ground, and (ii) transmit electrical energy to the ground station via the tether. In some embodiments, the ground station may transmit electricity to the aerial vehicle for take-off and/or landing, for example.

In an AWT, an aerial vehicle may rest in and/or on a ground station, for example, when the wind is not conducive to power generation. When the wind is conducive to power generation, such as when a wind speed may be 10 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

An aerial vehicle of an AWT may be configured for hover flight and crosswind flight. Crosswind flight may be undertaken for travel in a motion, such as in a substantially circular motion, and thus may be the primary technique that is used for generating electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some embodiments, the aerial vehicle may vertically ascend or descend in hover flight.

In crosswind flight, the aerial vehicle may be propelled by the wind substantially along a path on which, as noted above, it may convert kinetic wind energy to electrical energy. In some embodiments, the one or more propellers of the aerial vehicle may generate electrical energy by slowing down the incident wind.

The aerial vehicle may enter crosswind flight when (i) the aerial vehicle has attached wind-flow (e.g., steady flow and/or no stall condition (which may refer to no separation of air flow from an airfoil)) and (ii) the tether is under tension. Moreover, the aerial vehicle may enter crosswind flight at a location that is substantially downwind of the ground station.

In an example embodiment, the ground station can include a tether termination mount system for terminating a proximal end of the tether at the ground side, and tracking and measuring angular motion of the tether caused by flight motion of the aerial vehicle at a distal end of the tether. In an example embodiment, the tether can be of fixed length during a phase of generally stable flight, such as cross-wind flight. For example, a fixed length tether may be approximately 500 meters long and approximately 20 millimeters in diameter. The tether may include one or more insulated conductors to transmit electrical energy, or other electrical signals, along the tether length. Additionally or alternatively, the tether may include one or more optical fibers to transmit optical signals along the tether length.

By using a fixed length tether, the tether termination mount system can be used to measure two dimensions of tether angle and tether velocity. A tether termination mount system can also be used to measure the orientation of the tether, the rate of rotation of the tether, and the precession motion and nutation angles of a distal end of the tether. Angular orientation and motion of the tether can, in turn, be used in monitoring the position of the aerial vehicle with respect to the ground station during flight.

A tether termination mount system (or just a tether termination mount, for short) at the ground station may be desirable for various reasons. For example, the aerial vehicle in cross-wind flight may oscillate many times over the life of the system (for e.g., 30 million cycles of aerial vehicle and tether rotation), so a tether termination mount that does not wear or rub the tether may facilitate robust and reliable operation. In the case of rigid or semi-rigid tethers, a tether termination mount that does not impart significant bending loads onto the tether may similarly be desirable.

In the case of a tether with one or more conductors, a tether termination mount that does not accumulate twists in the tether may be desirable. Tether twisting can have an adverse effect on performance, because a twisted tether may have reduced conductivity due to the twisting or eventual breaking of the conductor(s), and/or may also have reduced tensile breaking strength. For example, the tether termination mount may either actively or passively rotate to align the tether at the ground-side system with the motion of the aerial vehicle. The tether termination mount may include a servomotor or other drive mechanism to manually rotate the tether and reduce the likelihood of significant tether twisting. Additionally in the case of a tether with one or more conductors, a tether termination mount that communicates power either into the ground side system or out to the aerial vehicle may be desirable.

In an example embodiment, the tether termination mount system can include a tether termination unit for terminating the proximal end of the tether. The tether termination unit can have a pointing axis direction along which the proximal end of the tether is aligned during the phase of generally stable flight. The tether termination unit can be configured for rotation about two axes, such that its angular motion induced by the tether motion responsive to flight motion of the aerial vehicle can provide the angular orientation and motion measurements of the tether termination system.

In an example embodiment, the tether termination unit can include a physical channel or tube-like structure through which the tether is threaded, and out from which the proximal end of the tether emerges or emanates toward the distal end where it couples to the aerial vehicle. As such, the tether termination unit can accommodate length adjustments of tether as necessary (e.g., for take-off and landing), while maintaining a physical termination that can track angular motion of the proximal end of the tether. In this configuration, the angular orientation and motion of the pointing axis of the tether mount can be used to track the proximal end of the tether.

In some embodiments, a tether termination mount system of the ground station can include a ground-side gimbal (GSG) comprising a set of bearings that allow the angles of connection of the tether to the ground station to change, and that help to reduce the flex within the tether. For example, the GSG can support two axes of rotation of the tether termination unit. In some embodiments, the GSG can also include a bearing that allows the tether to rotate about the tether axis, thereby allowing the tether to de-twist in cases in which the flight path of the aerial vehicle is topologically circular. In some embodiments, the GSG can further comprise a slip ring that allows electrical signals to be passed from the tether to the ground station as the GSG allows the tether to rotate about the tether axis.

An example embodiment of a GSG can include a two-axis mount, such as an altitude-azimuth mount, in which one axis is an altitude axis for rotation with respect to a local horizon, and the other axis is the azimuth axis for rotation with respect to a local vertical axis. Each axis can include a bearing to allow for a low overturning moment for easy rotation and one or more encoders for measuring angular position and rotation rate about the axis.

In an example embodiment, the ground station can include an imaging device configured for imaging the aerial vehicle in flight within an image plane. For example, the imaging device could be a digital camera. The ground station can further include a vehicle tracking subsystem configured for analyzing imaging of the vehicle in the image plane, in order to enhance the accuracy of the vehicle's position as otherwise determined by angular measurements of the tether measured by the tether termination mount system.

More particularly, the imaging device can be attached to the tether termination unit in a fixed orientation such that the pointing axis is perpendicular to the image plane and corresponds to a reference line-of-sight (LOS) direction in the image plane. For example, the pointing axis can correspond to the center of the field-of-view (FOV) of the image plane. In this configuration, the aerial vehicle can be viewed within the FOV of the image plane at least during a phase of generally stable flight. That is, physical tracking of the proximal end of the tether can provide a sufficiently accurate fix on the position of the aerial vehicle during stable flight to align the FOV with region that includes the aerial vehicle.

In example embodiments, the position of an image of aerial vehicle in the image plane can be analyzed in order determine an accurate location of the aerial vehicle with respect to the ground station (or the tether termination mount system). More particularly, the location of the aerial vehicle in the image plane can be rendered with respect to the center of the FOV, which can correspond to the pointing axis, as described above. Examples of analysis techniques for determining the location of the aerial vehicle's image in the image plane can include detection and/or recognition of predetermined patterns or markings on the aerial vehicle's surface. In addition, the aerial vehicle can be equipped with light-emitting diodes (LEDs) or other lights to aid or enhance image-plane detection. The relative location of the aerial vehicle's image can then be converted to a linear distance in a rectangular coordinate system (e.g., x and y), for example by geometry (and/or trigonometry). This linear distance can then be used as a correction to an estimated location of the aerial vehicle obtained from the pointing axis direction alone.

In an example embodiment, the ground station can include a distance ranging device, such a RADAR or LIDAR, which can be used to determine a LOS distance from the ground station to the aerial vehicle. A measured LOS distance can then be used to further improve a geometrically-determined (and/or trigonometrically-determined) correction to the location of the aerial vehicle with respect to the ground station (or the tether termination mount system). By way of example, the aerial vehicle could include one or more reflective spots configured for enhancing RADAR and/or LIDAR detection and ranging. RADAR and/or LIDAR devices can also provide imaging capabilities as well. Other techniques for LOS distance determination can be used as well. For example, propagation delay of a radio-frequency (RF) signal between a ground station and an aerial can be used to determine LOS distance. In addition to, or possibly in place of, signal-based distance measurement, the length of an extended tether can provide a measure of LOS distance. Tether length can be determined as the tether is unwound from a drum or spool, for example.

In an example embodiment, the imaging device and the distance ranging device could be integral components of single distance-imaging device. For example, imaging could be based on ranging data, such that LOS distance is inherent in the imagining data.

In an example embodiment, the imaging device could be configured for rotation of the image plane about the pointing axis, while the image plane still remains perpendicular to the pointing axis. In this configuration, the image plane can rotate about the pointing axis in response to twisting and de-twisting of the tether. This can further help alignment of the FOV of the image plane with the observed position of the aerial vehicle, thereby facilitating approximal siting of the aerial vehicle in the image plane.

In an example embodiment, the tether termination unit can include, or take the form of, a spindle. A spindle can be a cylindrical length of housing that extends from the tether termination mount system and through which the tether passes. The spindle can have two ends, a proximal spindle end and a distal spindle end. The proximal spindle end can be attached to the tether termination mount system. The distal spindle end can then extend towards the distal end of the tether for some distance. The distal spindle end can be connected to a bearing or some other type of sensor, such as a strain gauge or load cell to measure force. The tether may slide in and out of an inner race of the bearing to help accommodate elongation of the tether when the tether is loaded.

In a further aspect, the spindle can help to reduce bending loads on the tether termination mount system. The spindle may also increase the leverage the tether has on the two-axis mount, which in turn can help to increase the ability of the mount to follow the tether. Additionally, the spindle can help align the tether and the two-axis mount, which in turn can help to reduce the likelihood of binding forces on the bearings of the two-axis mount.

2. ILLUSTRATIVE SYSTEMS a. Airborne Wind Turbine (AWT) system

FIG. 1 depicts an AWT system 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130, for example to facilitate deploying of the aerial vehicle 130. Further, the ground station 110 may be further configured to receive the aerial vehicle 130 during a landing. The ground station 110 may be formed of any material that can suitably keep the aerial vehicle 130 attached and/or anchored to the ground while transitioning between hover and crosswind flight.

In addition, the ground station 110 may include one or more components (not necessarily shown), such as a winch, that may vary a length of the tether 120. Such components will be described in greater detail later in this disclosure. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters. However other lengths may be used as well.

The aerial vehicle 130 may be configured to fly substantially along a path 150 to generate (or while it generates) electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy that may be used in utility applications. Additionally, the materials may be chosen to allow for a lightning hardened, redundant and/or fault tolerant design which may be capable of handling large and/or sudden shifts in wind speed and wind direction. Other materials may be used in the formation of aerial vehicle as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8 ("figure eight"), among others.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to overcome gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, an so on. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In example illustrated in FIG. 1, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors that may be spaced along main wing 131.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

b. Illustrative Components of an AWT System

Figure 2:
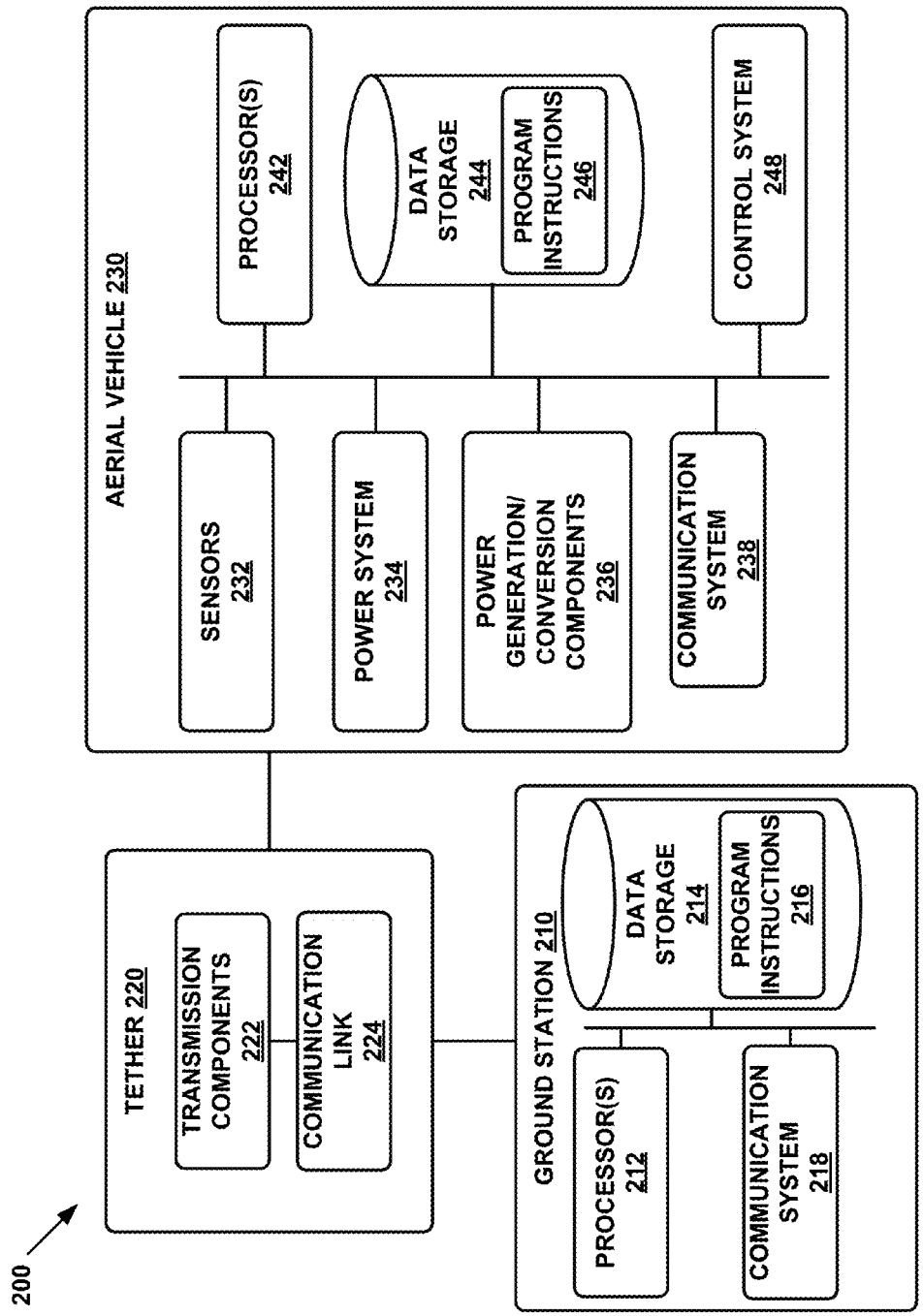
FIG. 2 illustrates a simplified block diagram illustrating components of an AWT, according to an example embodiment.

FIG. 2 is a simplified block diagram illustrating components of an AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in data storage 214 and are executable to provide at least part of the functionality described herein.

The data storage 214 may include or take the form of one or more computer-readable storage media that may be read or accessed by at least one processor 212. The one or more computer-readable storage media may include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that may allow for both short-range communication and long-range communication. For example, ground station 210 may be configured for short-range communications using Bluetooth and may be configured for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more insulated conductors that are configured to transmit electricity. And in at least one such example, the one or more conductors may include aluminum and/or any other material which may allow for the conduction of electric current. Moreover, in some implementations, the transmission components 222 may surround a core of the tether 220 (not shown).

The ground station 210 may communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. Some IMUs may be commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. For example, vehicle 230 may employ drift mitigation through fault tolerant redundant position and velocity estimations. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power in wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable vehicle that is connected to a tether, such as the tether 230 and/or the tether 110.

c. Illustrative Components of a Ground Station

Figure 3A:
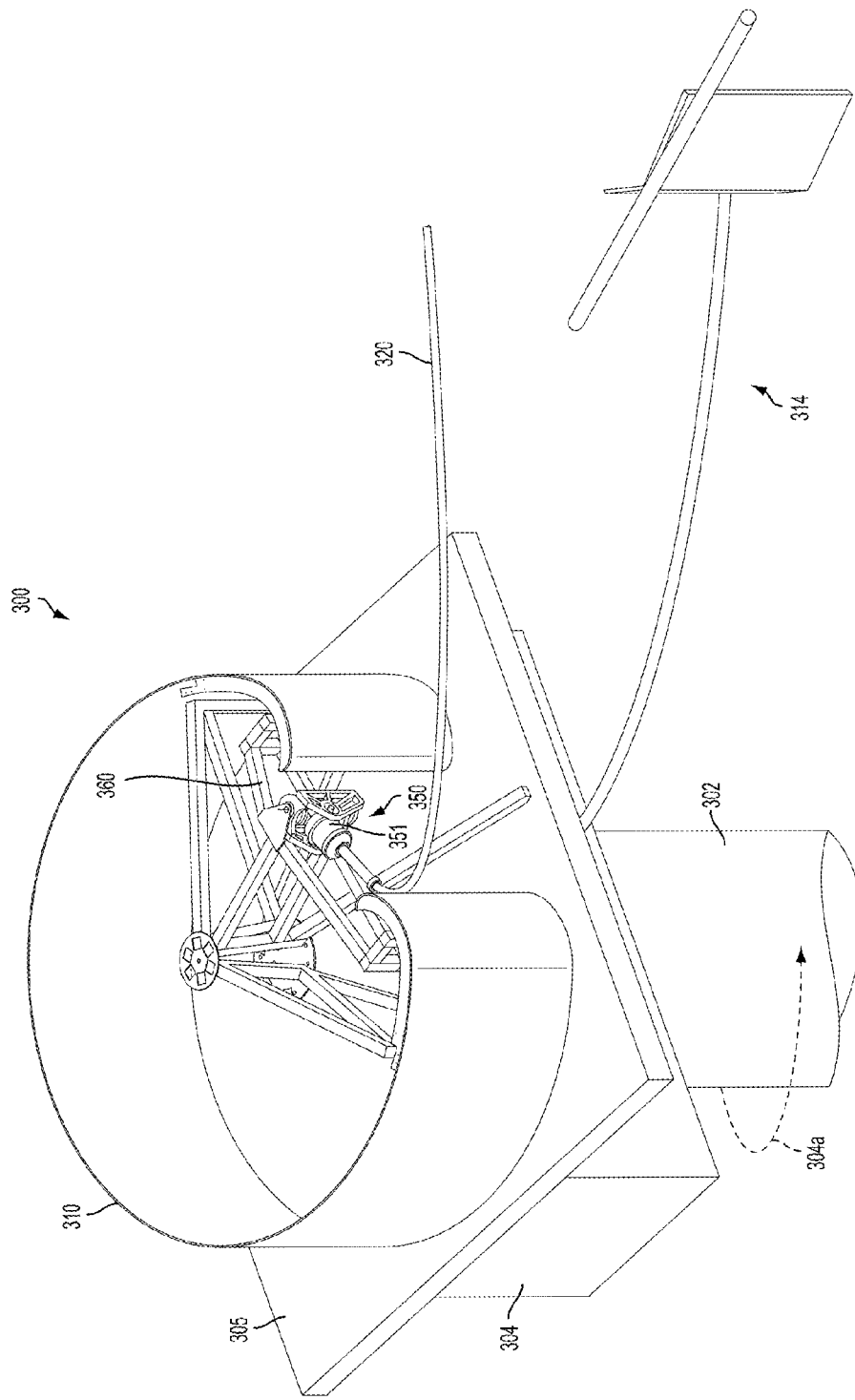
FIG. 3A illustrates a first perspective view of an example ground station for an aerial vehicle of an AWT, according to an example embodiment.

FIG. 3A illustrates a first perspective view of an example ground station for an aerial vehicle of an AWT, such as the aerial vehicle 130 illustrated in FIG. 1. The ground station 300 may be the same or similar to the ground station 210 of FIG. 2, or the ground station 110 of FIG. 1. FIG. 3A is representational only and not all components are necessarily shown. For example, additional structural or restraining components may not be shown.

The ground station 300 may include a vertical tower 302, platform 305, a tether termination mount system 350, and a perch assembly 314. The tower 302 and platform 305 may be used to facilitate the perch and launch of an aerial vehicle, such as the aerial vehicle 130 of the AWT illustrated in FIG. 1. In some embodiments, the platform 305 may be a perch platform upon which an aerial vehicle, such as the aerial vehicle 130, can perch (e.g., when landing).

The ground station 300 may also include a winch drum 310 and winch assembly (not shown), both of which may be coupled to the platform 305. The platform 305 may be coupled to a rotating member 304 and thereby rotatably coupled to the vertical tower 302. Via the rotating member 304, the winch drum 310, winch assembly, and the platform 305 may rotate around an axis such as around a vertical axis (e.g., rotate in an azimuthal plane). The rotating member 304 may be a passive slewing ring or an active slewing ring with a motor drive, for example. In this manner, the platform 305 may be rotated actively or passively around a vertical axis (representatively shown in FIG. 3A by arrow 304a). While disclosed embodiments make use of a slewing ring, any rotational bearing or other configuration may be used that may allow the platform 305 to rotate around the tower 302. The tower 302 may be a tubular steel structure, although any structure that can resolve aerial flight loads may be used.

The tether 320 may be connected to the ground station 300 via the tether termination mount system 350, and wound onto the winch drum 310 when the winch drum rotates. In accordance with example embodiments, the tether termination mount system 350 may include a tether termination unit 351 that serves as a coupling mechanism between the tether 320 and the tether termination mount system 350, and is configured for rotation about two axes in response to angular motion of tether 320 induced by flight motion of the aerial vehicle (such as the aerial vehicle 130). As described below, the tether termination unit 351 may take the form of an assembly of, or include, other components, including a slip ring and a spindle, for example. Also as described below, the two axes of rotation can correspond to respective axes two gimbals.

The tether 320 may be describe as having a distal tether end connected to an aerial vehicle of an AWT and a proximal tether end coupled with the tether termination mount system 350 by way of the tether termination unit 351. The tether 320 may include one or more insulated conductors that have a proximal conductor end terminated at the ground station 300 and a distal conductor end that is coupled to the aerial vehicle of an AWT. The tether termination mount system 350 may be coupled to the winch drum 310 in various ways. For example, the tether termination mount system 350 may be connected to a support structure 360, which in turn is connected to the winch drum 310. The tether 320 may be guided onto winch drum 310 via a levelwind (not shown).

The platform 305 (and winch assembly, including winch drum 310) may rotate in response to bias pressure applied by the tether 320 to the tether termination mount system 350. For example, if an AWT attached to the tether 320 changes its azimuth angle relative to winch drum 310 (or the platform 305), the tether 320 may apply bias pressure to the tether termination mount system 350, which may in turn cause the platform 305 to rotate passively towards the bias direction.

Alternatively or additionally, the tether termination mount system 350 may include sensors to detect bias pressure applied by the tether 320 to the tether termination mount system 350. The sensors may be pressure sensors, force sensors, vibrational sensors, or any other sensors configured to detect bias pressure. In response to detecting bias pressure, a motor (not shown) or other active component may then cause the platform 305 to rotate relative to the tower 302 and in the direction of the bias. Allowing or causing the platform 305 and winch assembly to rotate around the tower 302 and to face a tension force applied by the tether 320 can help reduce side loading forces and other undesirable forces acting on components of the ground station 300.

d. Illustrative Components of a Tether Termination Mount System

Figure 3B:
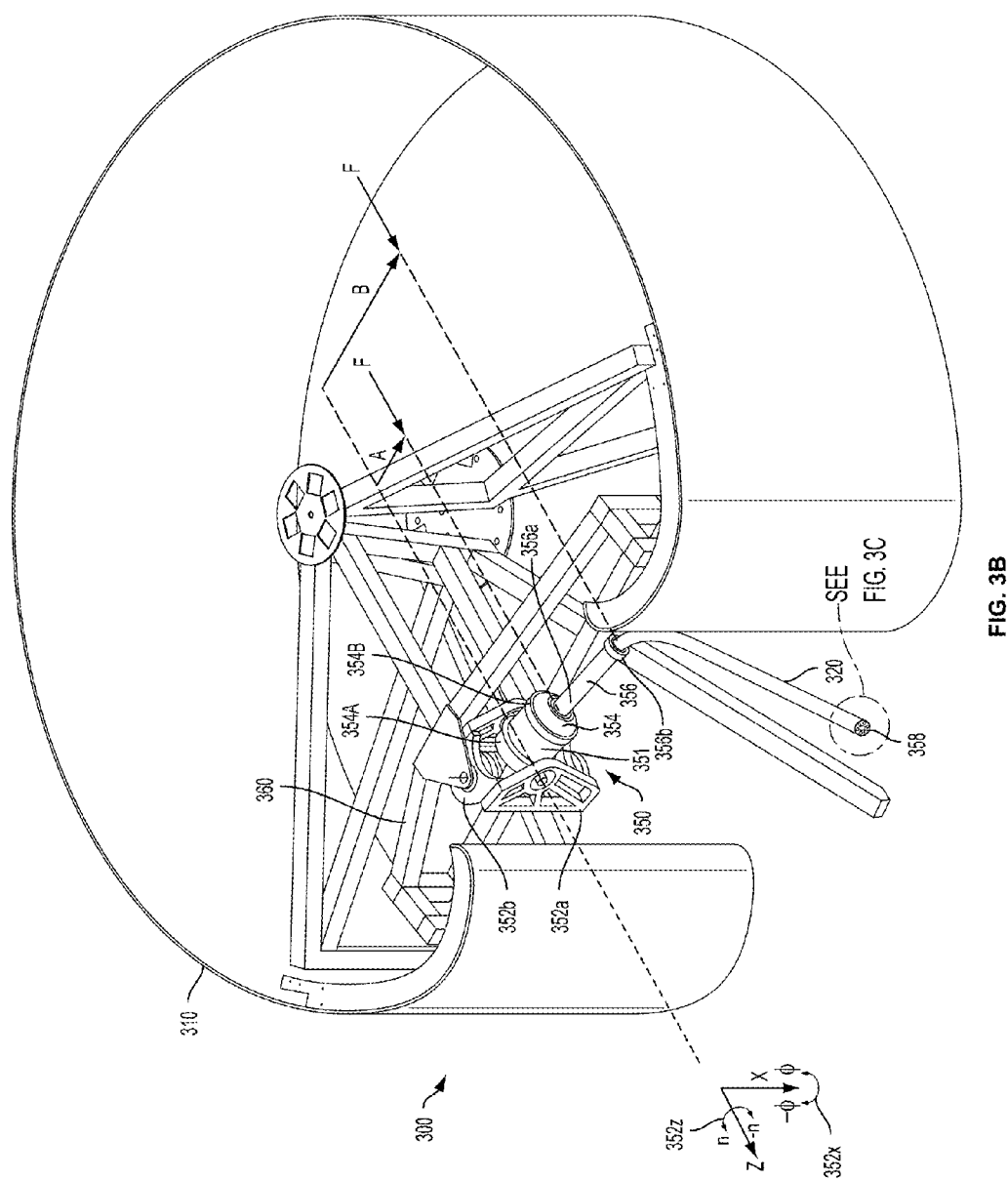
FIG. 3B illustrates a second perspective view of an example ground station for an aerial vehicle of an AWT, according to an example embodiment.

FIG. 3B illustrates a second perspective view of the ground station 300, which, again, may be similar to the ground station 210 of FIG. 2, or the ground station 110 of FIG. 1. FIG. 3B is representational only and not all components are shown. For example, additional structural or restraining components may not be shown.

As illustrated in FIG. 3B, the tether termination mount system 350 may be coupled to the winch drum 310 and may include one or more gimbals, for example the gimbals 352A and 352B, as well as the tether termination unit 351. In accordance with example embodiments, each of the gimbals 352A and 352B can serve as a structural support for the tether termination unit 351 that allows the tether termination unit 351 to rotate about a respective gimbal axis. For example, the gimbal 352A may be configured to allow the tether termination unit 351 to rotate about a primary axis, such as an elevation (also referred to as altitude) axis or a z-axis with a range of angles $\eta$ to $-\eta$ (representatively shown in FIG. 3B as arrow 352z, for the current orientation of the tether termination mount). Further, the gimbal 352A can be mounted in the gimbal 352B in a manner that allows the tether termination unit 351 to rotate about a secondary axis, such as an azimuth axis or an x-axis, with a range of angles $\phi$ to $-\phi$ (representatively shown in FIG. 3B as arrow 352x, for the current orientation of the tether termination mount). In FIG. 3B, the gimbals 352A and 352B are shown with rotational axes oriented perpendicular (orthogonal) to each other; however, the primary and secondary axes may be aligned at some orientation other than perpendicular. Also, the gimbals 352A and 352B may additionally or alternatively be configured to rotate without limitation as to the range of angles (i.e., a gimbal could rotate completely about its axis) or with varying limits to the range of angles. Additionally, there may be more or less than two gimbals in the system.

Each of the gimbals 352A and 352B may include a bearing system. The bearing system may have a low overturning moment to allow for easy rotation. In an example embodiment, the bearing system can include two radial bearings, with one bearing located near each end of gimbal system. Each the gimbals 352A and 352B may further include one or more encoders, such as a rotary encoder. The encoder may provide feedback related to speed, motion, and/or angular position of the gimbal about its axis of rotation.

In accordance with example embodiments, the tether termination unit 351 can be configured in the gimbals 352A and 352B such that both of the two gimbal rotation axis are orthogonal to a common pointing direction axis of the tether termination unit 351. With this arrangement, the pointing direction axis—or just "pointing direction" for short—will sweep through the range of rotation angles of the two gimbal rotation axes as the tether termination unit 351 rotates about the two axes. In particular, for the example configuration of FIG. 3B in which the gimbals 352A and 352B provide rotation about elevation and azimuth angles, and the pointing direction is perpendicular to both gimbal rotation axes, the pointing direction will point in a direction given by the elevation and azimuth angles of the gimbal axes at any given instant. It will be appreciated that other configurations of angular orientation between the pointing direction and the gimbal rotation axes could be used in which the pointing direction axis can sweep out range of elevation and azimuth angles. However, such other configurations may not necessarily provide a direct, one-to-one correspondence between gimbal rotation angle and elevation or azimuth of the pointing direction.

In accordance with example embodiments, the tether termination unit 351 can include a physical channel or tube through which the tether 320 is "threaded," and out from which the tether 320 emerges or "emanates" and then extends toward its connection point(s) on the aerial vehicle. More particularly, the physical channel (or tube) of the tether termination unit 351 can be aligned with the pointing direction. With this arrangement, the proximal end of the tether 320 can be described as emerging or emanating from the tether termination unit 351 along the pointing direction. As discussed below, the path of the tether 320 from its proximal end, where it emerges from the tether termination unit 351, to its distal end, where it connects to the aerial vehicle, may not necessarily remain aligned with the pointing direction, and may not necessarily even be a straight line.

In accordance with example embodiments, the tether termination unit 351 can be an assembly that includes a slip ring 354, and a spindle 356. The physical channel of the tether termination unit can pass through both the slip ring 354 and the spindle 356. The slip ring 354 can include a stationary portion 354A and a rotatable portion 354B. The slip ring 354 may be any electromechanical device that allows transmission of power and electrical signals from a rotating structure to a stationary structure, and may be used during unrestrained, intermittent or continuous rotation. In an example embodiment, the slip ring 354 can be constructed such that its rotatable portion 354B is configured for rotation about the point direction axis.

As illustrated in FIG. 3B, the slip ring 354 may be directly connected to the tether termination mount system 350. For example, the stationary portion 354A of slip ring 354 may be mechanically coupled to gimbal 352A. As such, the stationary portion 354A, being an assembly component of the tether termination unit 351, can serve as a physical coupling of the tether termination unit 351 to the gimbal 352A. The rotatable portion 354B can be configured for rotation about the pointing direction in response to rotation of the tether 320 about its axial dimension. The rotatable portion 354B and the tether 320 may further be electrically coupled. The stationary portion 354A and the rotatable portion 354B may also be electrically coupled, which can then enable the tether 320 to rotate while still communicating power and/or electrical signals to the ground station 300. For example, the proximal conductor end of one or more insulated conductors 358 included in tether 320 may be electrically coupled to the rotatable portion 354B of the slip ring 354. Slip ring 354 may be rotated actively (e.g., with a servomotor) or rotated passively (e.g., with potential energy stored by the action of a rotating tether in a torsion spring).

As noted, the tether termination unit 351 may also include a spindle 356, for example as an assembly component. The spindle 356 may be a length of housing that extends from the tether termination unit 351. In accordance with example embodiments, the tether 320 can pass through the spindle 356 via the physical channel. Alternatively the tether 356 could be fixed along the spindle 356.

For purposes of discussion the spindle 356 can be described as having a proximal spindle end 356a, where the spindle attaches to the tether termination unit 351, and a distal spindle end 356b, from which the tether 320 emerges or emanates. In the example embodiment illustrated in FIG. 3B, the proximal spindle end 356a may be attached to the tether termination unit 351 by way of the slip ring 354. The distal spindle end 356b may extend towards the distal point of the tether for some length. In an example embodiment, the distal spindle end 356b may include a bearing system, for example, a radial bearing, which may be used to accommodate rotation of the tether 320 within or about the spindle 356.

In further accordance with example embodiments, the spindle 356 may help to reduce bending loads on portions of the tether termination mount system 350, such as on the gimbals 352A and 352 B and/or slip ring 354. For example, if the tether 320 is connected to an aerial vehicle of an AWT in cross-wind flight, the tether 320 may act as a bending load on those, and other, portions of the tether termination mount system 350. The spindle 356 may extend the point of contact of the tether 320 on the tether termination mount system 350. For example, FIG. 3B illustrates a spindle 356 extending the point of contact of the tether 320 on the tether termination mount system 350 by the distance from 356a to 356b. Consequently, the spindle 356 may also increase the leverage the tether 320 has on the tether termination mount system 350, which in turn may help to increase the ability of the tether termination mount system 350 to turn and follow the tether 320. As shown in FIG. 3B, the spindle 356 can act as a lever for applying greater leverage from the tether 320 to the tether termination mount system 350 than would be applied without the spindle 356.

Considering a tether termination unit 351 that, for purposes of an example comparison, does not include a spindle 356, a bias pressure or force from the tether 320 would apply a relatively low level of rotational torque to the tether termination mount system 350 about one or more of the gimbal axes. For example, taking the lever arm of a spindle-less tether termination unit 351 to the be the vector A of length $\|A\|$, and the force vector applied by a biased tether 320 to be F, the torque, $T_1$, applied to a gimbal axis may be calculated as $T_1 = F \times A$, where × denotes the cross product.

In contrast, a tether termination unit 351 that does include a spindle 356 can develop a larger torque for the same applied tether force F at a distance greater than $\|A\|$. For example, taking a lever arm vector B of length $\|B\|$, where $\|B\|$ is $\|A\|$ plus the length of the spindle 356, as shown in FIG. 3B, then applying the tether force F at the distal tether end 356b will result in a torque $T_2$ given by $T_2 = F \times B$, where × again denotes the cross product. For the same force F in both cases, and the same angle between F and A as between F and B, the resulting torque $T_2$ the applied to the tether termination mount system 350 will have a larger magnitude than the torque $T_1$ that would be applied to the tether termination mount system 350 where a spindle 356 is not utilized.

In further accordance with example embodiments, the distal spindle end 356b may include a sensor (e.g., a force sensor such as a strain gauge or a load cell). For example, a force sensor may be used to determine the force of the tether 320 against the distal spindle end 356b. This force may be used to determine whether to actively rotate a portion of the ground station 300. For example, if the determined force of the tether 320 against the distal spindle end 356b is above a threshold, the winch assembly may actively rotate the winch drum 310 in a direction to reduce force. To help accommodate elongation of the tether 320 when the tether 320 is loaded, the tether 320 may be allowed to slide within or along the sensor, as noted.

Figure 3C:
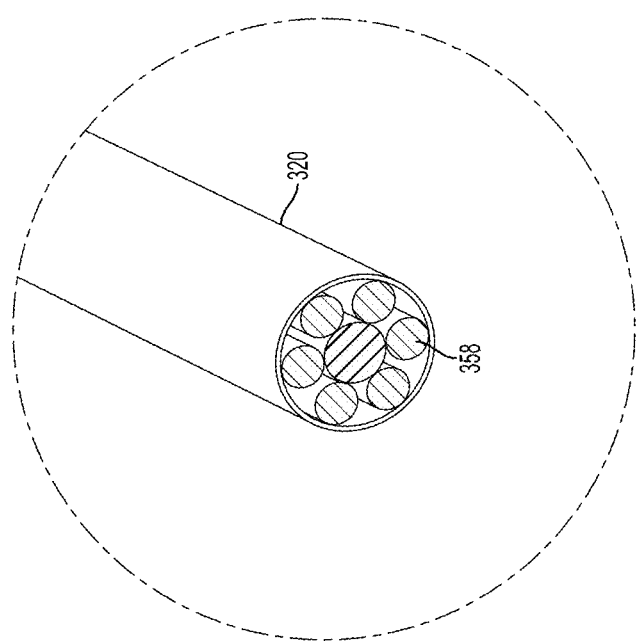
FIG. 3C illustrates a cross-sectional view of an example tether with insulated electrical conductors, according to an example embodiment.

FIG. 3C illustrates a cross-section view of a tether with insulated electrical conductors, according to an example embodiment. The tether 320 may have one or more insulated electrical conductors 358 as previously described. In addition, the tether 320 can include one or more fiber-optic cables or carriers (e.g., optical fibers) configured for transmitting optical signals between a ground station, such as the ground station 300, and an aerial vehicle, such as the aerial vehicle 130.

Figure 4:
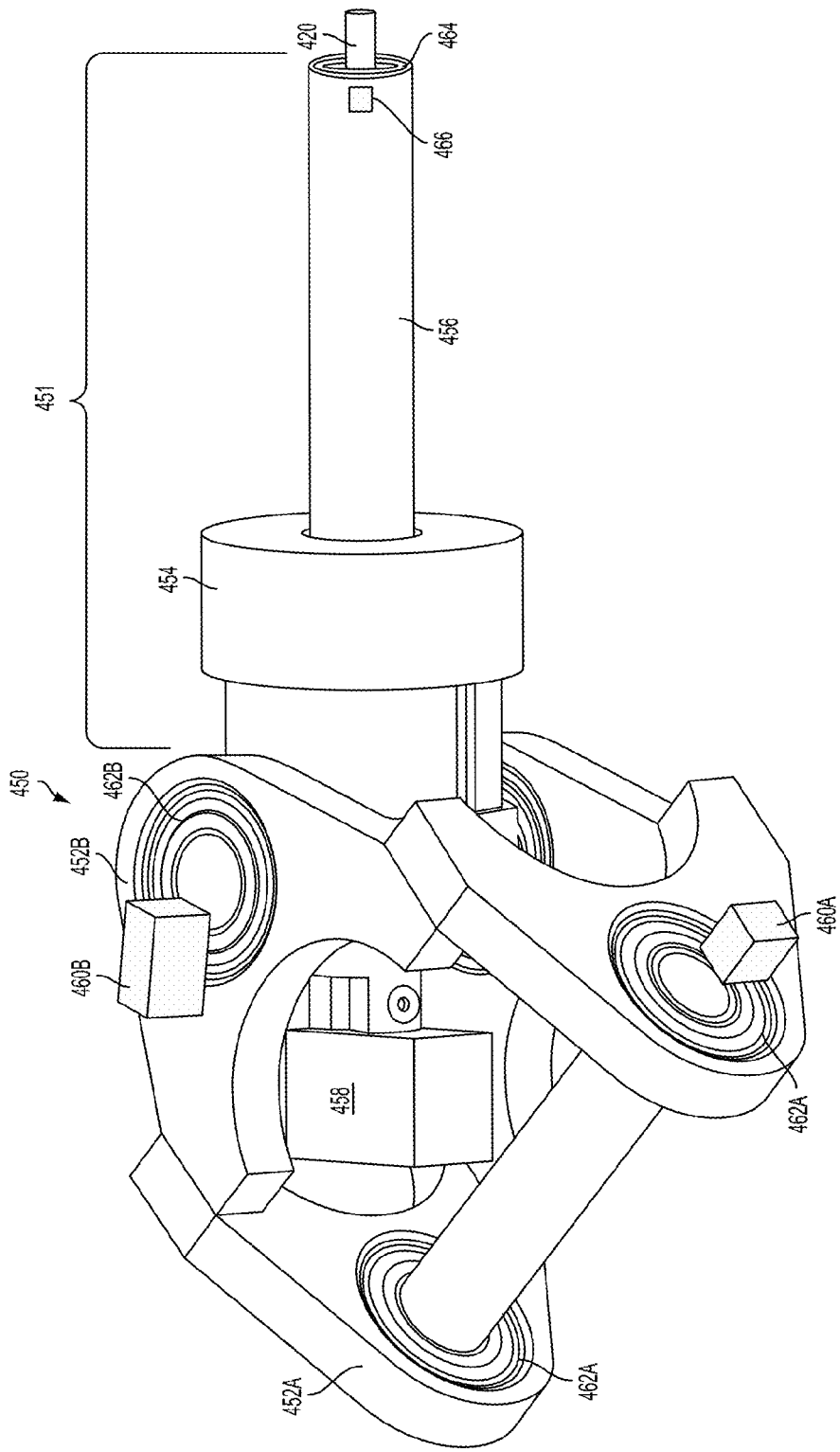
FIG. 4 illustrates a perspective view of an example embodiment of a tether termination mount system for a ground station of an aerial vehicle of an AWT.

FIG. 4 illustrates a perspective view of an alternative embodiment of a tether termination mount system 450 for a ground station of an aerial vehicle of an AWT, such as the aerial vehicle 130 illustrated in FIG. 1. The tether termination mount system 450 may be the same or similar to tether termination mount system 350 of FIG. 3B. FIG. 4 is representative only and not all components are shown. For example, additional structural or restraining components may not be shown.

The tether termination mount system 450 may include gimbals 452A and 452B, a slip ring 454, a spindle 456, a drive mechanism 458, encoders 460A and 460B, gimbal bearing systems 462A and 462B, a spindle bearing system 464, and a spindle sensor 466. These components may operate with a tether 420 and ground station in the same or a similar manner to those already described. As shown, the spindle 456 and slip ring 454 may be components of a tether termination unit 451. Note that the tether termination unit 451 may extend leftward of the gimbal 452B, although the identifying bracket delineating the tether termination unit 451 stops short of the gimbal 452B to avoid overcrowding of elements in FIG. 4.

As described above, the tether 420 may rotate, for example, due to the cross-wind flight pattern of an aerial vehicle of an AWT. In an example embodiment, the drive mechanism 458 may actively or passively rotate a rotatable portion of the slip ring 454 and/or the spindle 456. As illustrated in FIG. 4, a drive mechanism 458 may be directly connected to the slip ring 454, or it may be coupled to the slip ring 454 through a drivetrain or other power transmission system. The drive mechanism 458 may actively rotate the rotatable portion of the slip ring 454 to follow the rotation of the tether 420 about its axial dimension. For example, the drive mechanism 458 may be a servomotor. In a further aspect, the drive mechanism 458 may passively rotate the rotatable portion of the slip ring 454 to follow the rotation of the tether 420. For example, the drive mechanism 458 may be a torsion spring that stores potential energy P from the action of a rotating tether until the potential energy P is greater than an overturning moment M required to turn the rotatable portion of the slip ring 454.

e. Illustrative Components and Operation of Enhanced Aerial Vehicle Tracking

As described above, the tether termination unit (e.g., tether termination unit 351 or 451) may be configured for rotation about the gimbal axes in response to motion of the tether (e.g., tether 320), as an aerial vehicle (e.g., aerial vehicle 130) connected to the tether moves in flight. During stable flight of the aerial vehicle, such as in cross wind flight, the tether may tend to extend from the tether termination unit toward the aerial vehicle generally along the pointing direction of the tether termination unit. As a result, the angular motion of the tether termination unit may tend to approximately track the motion of the aerial vehicle. If the tether were perfectly rigid and straight, angular tracking of the aerial vehicle by the tether termination unit could be nearly exact. In practice, however, the tether, describable as a flexible cable line, can be subject to forces that may cause it to deviate from following a straight-line path to the aerial vehicle. For example, the tether may tend to sag vertically in a catenary droop under the force of gravity. In addition, the tether may experience both horizontal and vertical drag forces as the aerial vehicle moves about in flight. And angular motion of the tether can also result in curvature due to inertial forces. As a consequence of any or all of these forces, the pointing direction of the tether termination unit may be rendered an approximation of the angular position of the flying aerial vehicle. Correspondingly, the gimbal axis angles, as measured by the encoders, for example, may also then provide approximate rather than precise determinations of the flying vehicle's angular position in the sky.

Figure 5:
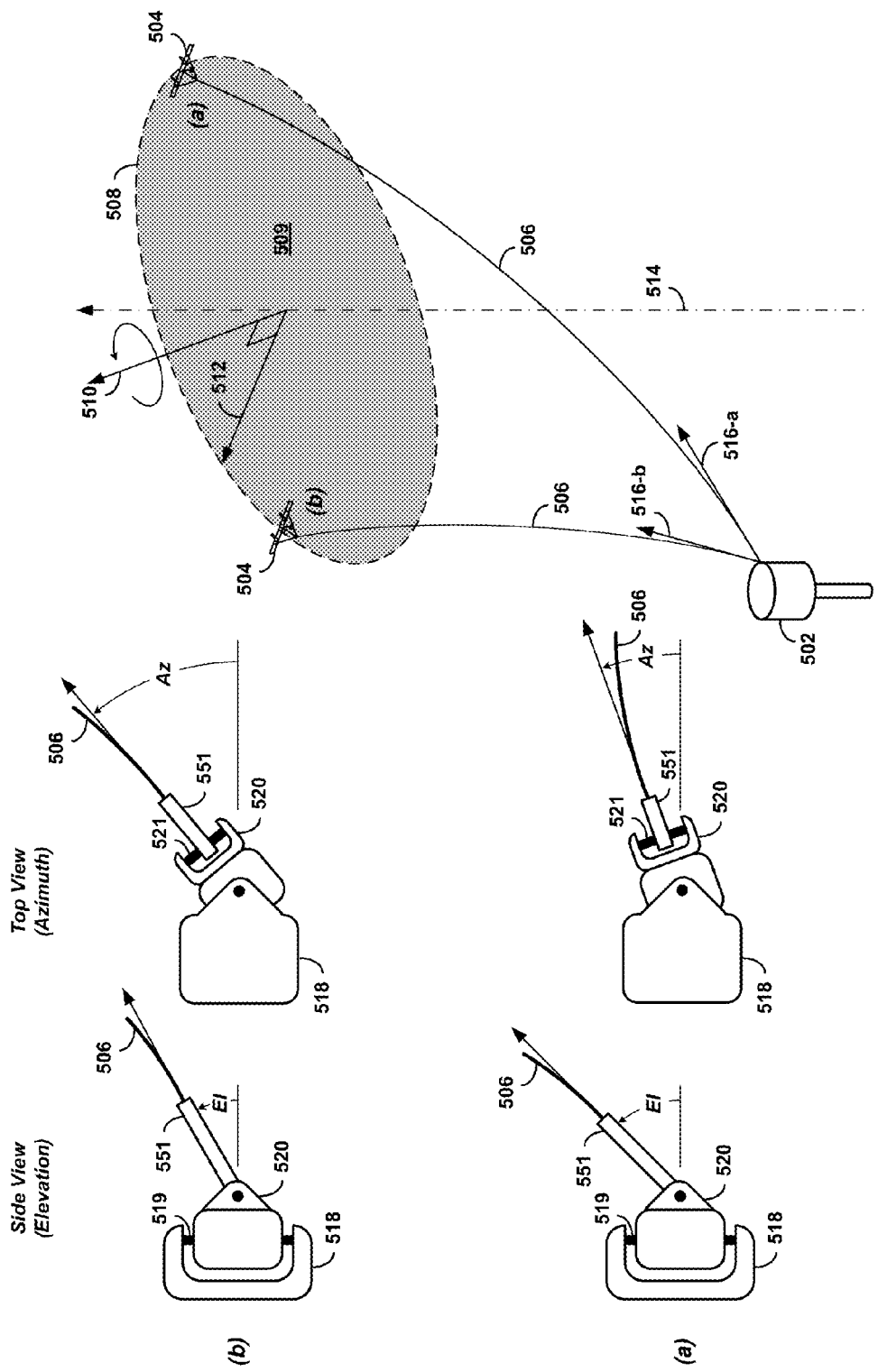
FIG. 5 is schematic illustration of example operation of a tether termination mount system, according to an example embodiment.

Pointing direction of the tether termination unit and angular motion of the tether termination unit induced by a tether in response to flight motion of an aerial vehicle are illustrated conceptually by way of example in FIG. 5. The right hand side of FIG. 5 depicts a ground station 502 to which a flying aerial vehicle 504 is tethered via a tether 506. The ground station 502 could be the same or similar to the ground stations 110, 210, or 300 described above, for example. However, for purposes of the present illustration, detailed depiction of components of the ground station 502 are not necessarily shown in FIG. 5.

By way of example, the aerial vehicle 504 is shown at two locations, labeled "(a)" and "(b)," along a substantially circular path 508 lying in a plane 509. In the example illustrated, the aerial vehicle 504 may be considered as circling (at least approximately so) about a rotation axis 510, which is depicted as being perpendicular to the plane 509; the circular path 508 has a radius 512 that lies in the plane 509, which is depicted as being inclined to the vertical line 514. The vertical height of the aerial vehicle can be referenced to the vertical line 514. It should be noted that the concepts illustrated in this example do not necessarily rely on the level of specificity of the path of the aerial vehicle 504 is described herein, and that other paths of flight motion of the aerial vehicle 504 are possible as well. For example, the path could be a "figure-8" in a plane, such as the plane 509; or the plane could be oriented vertically.

The depiction of the flight motion of the aerial vehicle 502 in FIG. 5 also illustrates curvature of the tether 506, which could result from one or more of the forces described above. In particular, the example shows how the pointing direction of the tether termination unit can deviate from the angular position of the aerial vehicle. As illustrated, when the aerial vehicle 504 is at location (a), the tether termination unit points in pointing direction 516-a; when the aerial vehicle 504 is at location (a), the tether termination unit points in pointing direction 516-b. Because of the curvature of the tether on its path from the ground station to the aerial vehicle 504, the pointing directions 516-a and 516-b each appear to point only generally (or approximately) in the direction of the aerial vehicle 504 at the locations (a) and (b), respectively. To the extent that the pointing direction can be measured in terms of gimbal axis angles, the measured gimbal axis angles may in turn yield only approximate locations of the aerial vehicle during flight.

The left hand side of FIG. 5 is a schematic depiction of the relation between the pointing direction of a tether termination unit 551 and the tether 506 for the aerial vehicle 504 at locations (a) and (b). By way of example, the tether termination unit 551 is taken to be mounted in an elevation gimbal 520 and an azimuth gimbal 518, which together enable the tether termination unit to rotate simultaneously in elevation angle, about an elevation rotation axis 521, and azimuth angle, about an azimuth rotation axis 519. For each of the locations (a) and (b) of the aerial vehicle 504, an elevation angle "El" of the tether termination unit 551 (and of the elevation gimbal 520) is shown in a side view (as labeled), and an azimuth angle "Az" of the tether termination unit 551 (and of the azimuth gimbal 518) is in a top view (as labeled). The side view corresponds to a view along a direction co-aligned with (parallel to) the elevation rotation axis 521; the top view corresponds to a view along a direction co-aligned with (parallel to) the azimuth rotation axis 519. Note that the gimbals 518 and 520 are represented schematically in FIG. 5, and the structural components are illustrative and not necessarily shown to scale.

In each view and for each of the locations (a) and (b), the pointing direction of the tether termination unit 551 is represented as a straight arrow aligned with the tether termination unit 551. As shown by way of example for both of locations (a) and (b) and in both the top an side views, the pointing direction appears to be tangent to the tether 506 at the proximal end, where the tether 506 emanates from the tether termination unit 551. But beyond this point, where the tether 506 follows a path to the aerial vehicle 504, the tether 506 appears to curve away from the pointing direction. This again illustrates that the pointing direction may provide an approximate sighting direction to the aerial vehicle 504, but may not necessarily point directly at the aerial vehicle 504 on a persistent basis. Consequently, measurements of the gimbal axis angles, for example as provided by angle encoders, may not necessarily yield persistently accurate elevation and azimuth angles of the aerial vehicle 504.

For purposes of the discussion herein, the pointing direction of a tether termination unit, such as the tether termination unit 551, can be considered as providing (or corresponding to) a "nominal pointing direction of the aerial vehicle," or just "nominal pointing direction" for short. There may be instances when the tethered flying aerial vehicle moves directly across, or lingers direction in, the nominal pointing direction—and for such an instances, the nominal pointing direction may coincide with the true direction of the aerial vehicle. However, because of the generally curved path of the tether, the nominal pointing direction may not generally be a persistent indicator of the aerial vehicle's true angular position in the sky.

In accordance with example embodiments, one or more adaptive measurement techniques can be applied to the nominal pointing direction of a tethered flying aerial vehicle in order to determine one or more corrections to the nominal pointing direction, and to thereby derive a corrected pointing direction that more accurately corresponds to a true direction to the aerial vehicle. More specifically, an imaging device can be attached to the tether termination unit with an image plane of the imaging device oriented at a fixed angle to the pointing direction. In an example embodiment, the fixed angle could be 90°, so that the image plane is perpendicular to the pointing direction. In this configuration, a line-of-sight (LOS) direction of the imaging device that is normal to the image plane will be parallel to the pointing direction, and thus also parallel to the nominal pointing direction of the aerial vehicle.

In further accordance with example embodiments, the nominal pointing direction can serve as a sufficiently accurate alignment between the LOS direction and the true direction to the aerial vehicle to accommodate sighting of the aerial vehicle within a field-of-view (FOV) of the image plane. An image of the aerial vehicle in the image plane can be analyzed to derive an angular offset between the LOS in the image plane and the image of the aerial vehicle. The derived angular offset can then be used to determine corrections to one or more measured angles of the pointing direction. The determined corrections can be applied to the one or more measured angles in order to determine corrected angles that more accurately correspond to the true angular position of the aerial vehicle in the sky, as determined with respect to a ground station 502.

Figure 6:
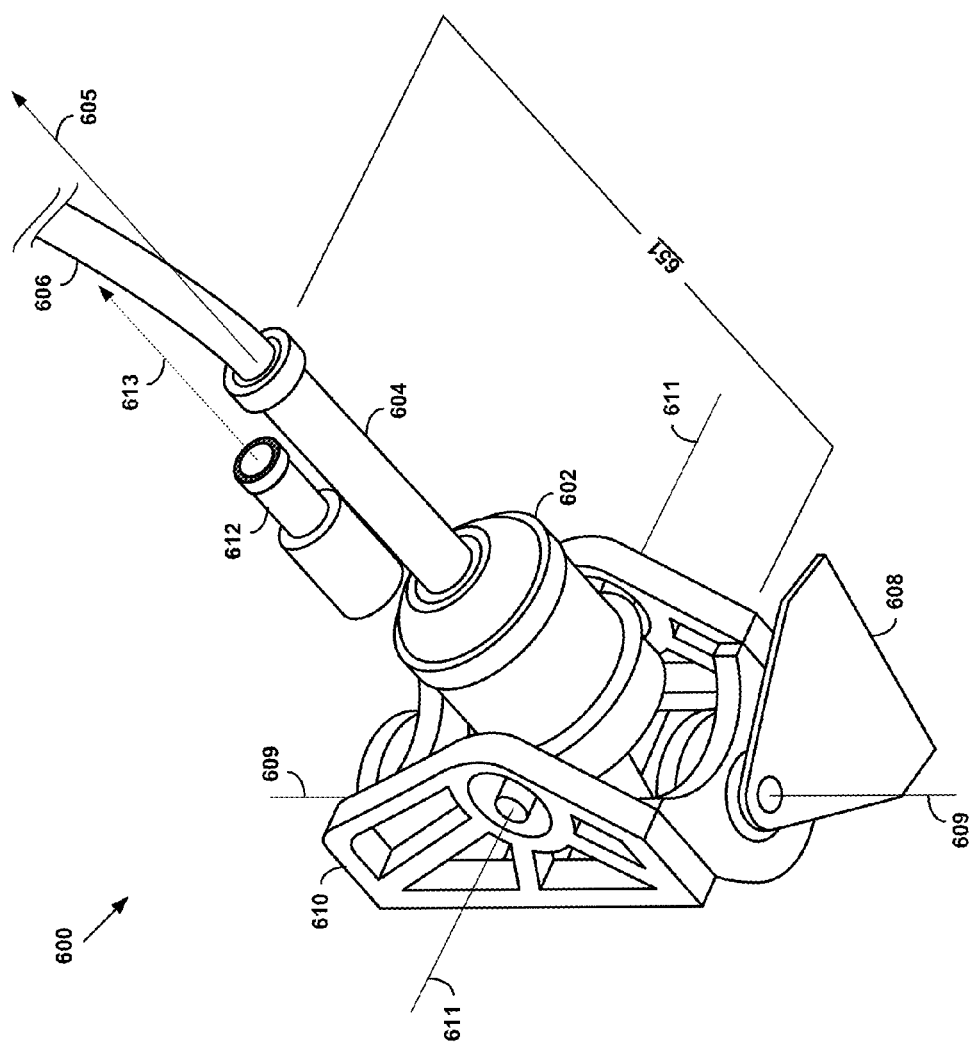
FIG. 6 illustrates a perspective view of an example tether termination mount system, according to an example embodiment.

FIG. 6 illustrates a perspective view of an example tether termination mount system 600 that includes an imaging device 612, according to an example embodiment. By way of example, the tether termination mount system 600 includes a tether termination unit 651 mounted in a gimbal 608 with a rotation axis 609, and in a gimbal 610 with a rotation axis 611. In accordance with example embodiments, the gimbal 608 could be an azimuth gimbal and the rotation axis 609 could be an azimuth axis; and the gimbal 610 could be an elevation gimbal and the rotation axis 611 could be an elevation axis. However, other axial orientations could be used as well. Also in accordance with example embodiments, the tether termination unit 651 can be an assembly including a slip ring 602 and a spindle 604, as shown. These components could the same or similar to the slip rings and spindles discussed above.

In further accordance with example embodiments, a tether 606 can emerge from (or emanate from), or be coupled to, a distal end of the spindle 604 (only a portion of the proximal end of the tether 606 is shown). As illustrated, the tether termination unit 651 (and by extension the spindle 604) has a pointing direction 605 aligned with an axial dimension of the spindle 604. A depiction of the tether 606 as curving away from the pointing direction 605 is meant to represent the tether curvature, as discussed above, which can result in a mis-alignment between the pointing direction 605 and a true angular position of a tethered flying aerial vehicle in the sky.

In accordance with example embodiments, the imaging device 612 can be attached to the tether termination unit 651, with a LOS direction 613 co-aligned with the pointing direction. The imaging device 612 can be a camera including a lens or other focusing element. Non-limiting examples of an imaging device 612 include a digital camera, a line-scan camera, an imaging RADAR, and an imaging LIDAR. For the LOS direction 613 oriented normally to an image plane of the imaging device 612, this configuration orients the image plane normally to the pointing direction as well. In further accordance with example embodiments, a FOV of the image plane can be sufficiently large in angular projection on the sky (and in the LOS direction 613) to be able to capture the flying aerial vehicle at least under circumstances of stable flight (such as during cross wind flight).

Figure 7:
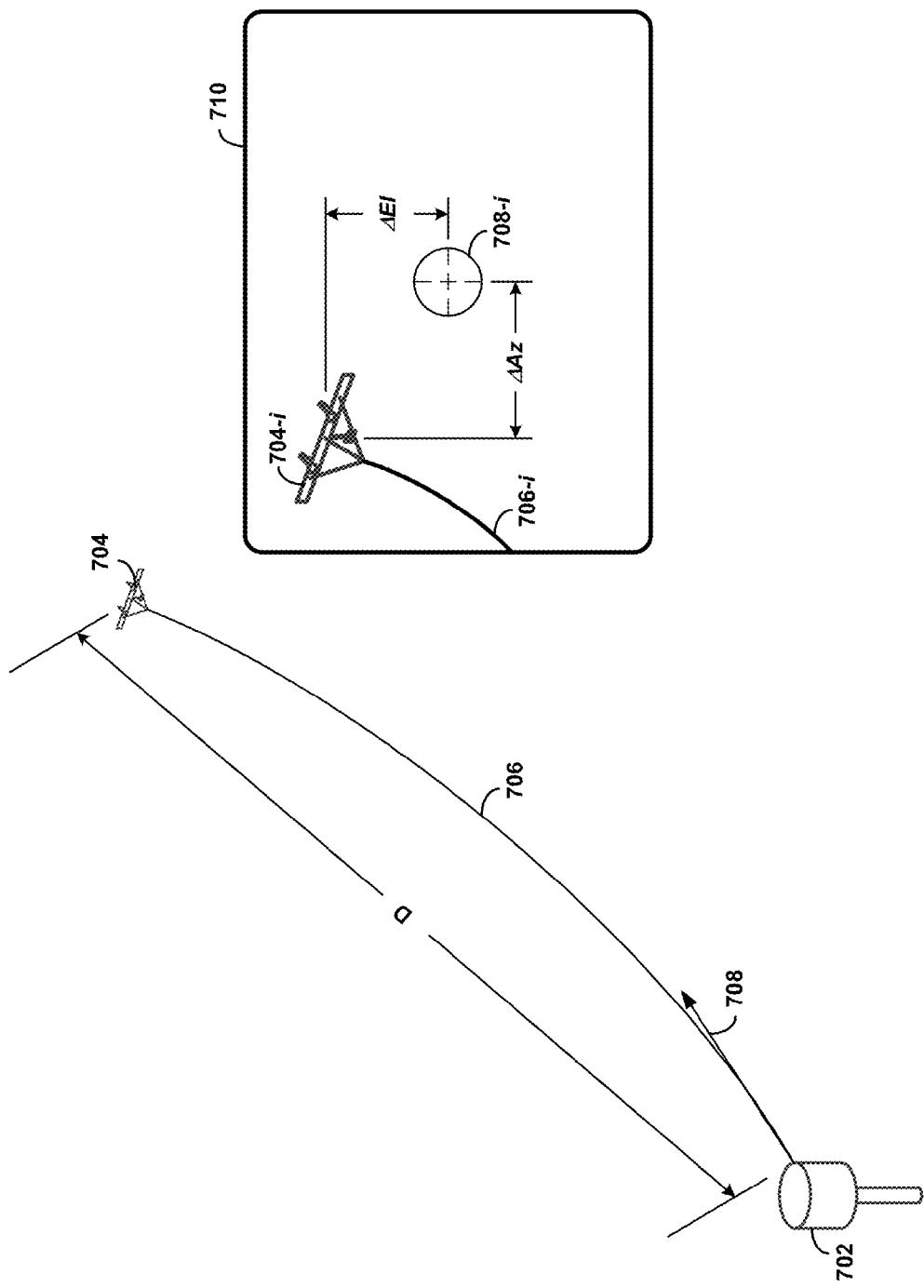
FIG. 7 is schematic illustration of an example image plane during example operation of a tether termination mount system, according to an example embodiment.

FIG. 7 is schematic illustration of an example image plane during example operation of a tether termination mount system, according to an example embodiment. The left hand side of the figure depicts a ground station 702 to which a flying aerial vehicle 704 is tethered via a tether 706. The ground station 702 could be the same or similar to the ground stations 110, 210, or 300 described above, for example. However, for purposes of the present illustration, detailed depiction of components of the ground station 702 are not necessarily shown in FIG. 7. In accordance with example embodiments, the ground station 702 can also include an imaging device, such as the imaging device 612.

As shown, a pointing direction 708 of a tether termination unit (not shown) of the ground station 702 points in an approximate direction of the aerial vehicle 704. But because of curvature of the tether 706, the pointing direction 708 may not align precisely with a true angular position of the aerial vehicle 704 in the sky. As described above, the pointing direction 708 can also be taken to be a nominal pointing direction of the aerial vehicle 704.

The right hand side of FIG. 7 shows a representational depiction of an image plane 710 of an imaging device (not shown), such as imaging device 612, that could be attached to the tether termination unit of the ground station 702. In accordance with example embodiments, the image plane can be oriented perpendicularly to the pointing direction 708, and aligned so that the pointing direction 708 coincides with the center of the FOV of the image plane 710. This coincidental alignment is indicated by a bore sight 708-$i$ marking the center of the FOV of the image plane 710. The bore sight 708-$i$ can also be taken as the LOS of the imaging device viewed in the image plane 710, as well as the position of the nominal pointing direction in the FOV.

By way of example, a representation of an aerial-vehicle image 704-$i$ of the aerial vehicle 704 is displayed in the FOV of the image plane 710, to the left and above the bore sight 708-$i$. A tether image 706-$i$ of a portion of the tether 706 near its distal end is also displayed in the image plane 710. The apparent offset between the position of the aerial-vehicle image 704-$i$ and the bore sight 708-$i$ exemplifies a mis-alignment between the pointing direction 708 and the true angular position of the aerial vehicle 704 in the sky. The appearance of an aerial-vehicle image 704-$i$ of the aerial vehicle 704 in the FOV of the image plane 710 also exemplifies the functional aspect of the pointing direction 708 that, in accordance with example embodiments, enables the aerial vehicle 704 to be captured visually within the FOV of the image plane 710 by tracking (at least approximately) the tethered flying aerial vehicle 704 via tether motion.

In accordance with example embodiments, the apparent offset between the position of the aerial-vehicle image 704-$i$ and the bore sight 708-$i$ can be used to determine one or more corrections to angular measurements of the pointing direction 708, and to thereby determine a more accurate measurement of the angular position of the aerial vehicle 704 on the sky. The correction technique is illustrated by way of example by an azimuth correction "$\Delta Az$" and an elevation correction "$\Delta El$" indicated in the image plane 710. As shown, these two corrections correspond to azimuth and elevation components of the offset. In an example embodiment, the FOV of the image plane 710 could have linear dimensions measured in angular degrees. For example, the horizontal width of the FOV, corresponding to azimuthal extent, could be 20°; and the vertical height of the FOV, corresponding to elevation extent, could be 15°. It will be appreciated that these are example sizes of angular extent, and that other sizes could be used as well.

In further accordance with example embodiments, the image plane 710 could correspond to a two-dimensional pixel array. With this arrangement, and ignoring possible FOV distortion due to the lens, each pixel could correspond to an azimuthal angular resolution given approximately by the azimuthal angular extent of the FOV of the image plane 710 divided by the number of pixels in the horizontal (azimuthal) direction. Similarly, each pixel could correspond to an elevation angular resolution given approximately by the elevation angular extent of the FOV of the image plane 710 divided by the number of pixels in the vertical (elevation) direction. Analysis of the image plane 710 can then be used to determine each of $\Delta AZ$ and $\Delta El$ in terms of a respective number of pixels, which can be converted angular offset by multiplying by the angular resolution a pixel in the each dimension (azimuth and elevation). For some configurations, the lens of an imaging device can introduce some distortion, such that angular resolution and/or angular position in the image plane may not be a simple linear function of pixel position. One example among others is a fish-eye lens. In such cases, a mapping function can be devised that accounts or compensates for one or another type of distortion or nonlinear relation between pixel position and angular resolution and/or position in the FOV. Analysis of the image plane 710 can then include application of the mapping function.

Considering again an example of a 20° by 15° (azimuth by elevation) image plane of an example imaging device with a linear mapping function (i.e., fixed angular size for all pixels), and taking, also by way of example, the number of pixels in the azimuth and elevation dimensions of the image plane 710 to be 1,024 and 780, respectively, the angular resolution of each pixel would then be approximately 0.02° in each dimension. If, in example operation, the aerial-vehicle image 704-$i$ were determined to be 300 azimuth pixels to the left of the bore sight 708-$i$ and 250 elevation pixels above the bore sight 708-$i$, then the angular offsets could be determined to be $\Delta Az \approx 12°$ and $\Delta El \approx 5°$. These corrections could be added to the azimuth and elevation angles of the pointing direction 708 to determine an accurate angular position of the aerial vehicle 704 in the sky, as measured with respect to the ground station 702.

In further accordance with example embodiments, the angular orientation of the pointing direction can be measured with respect to local reference angles at the ground station 702. For example, the elevation angle could be measured with respect to a local horizon at the ground station, and the azimuth angle could be measured with respect a local meridian (line of geographic or geodetic longitude). However, the local reference angles could be other than a local horizon angle and/or local meridian.

In accordance with example embodiments, a ground station, such as the ground station 702, for example, can determine a distance to a tethered, flying aerial vehicle, such as aerial vehicle 704. Distance determination is signified in the illustration of FIG. 7 by a distance "D" shown between the ground station 702 and the aerial vehicle 704. One technique can be to determine the length of the tether during flight, and then take the length to be at least an estimate of the distance. Tether length can be determined, for example, by monitoring and measuring the tether as it is unwound (e.g., from a drum or spool) during ascent of the aerial vehicle.

In further accordance with example embodiments, a LOS distance from the ground station 702 to the aerial vehicle 704 can be determined using a distance ranging device. The distance ranging device can also be attached to the tether termination unit. For example, the distance ranging device can be separate from the imaging device. Alternatively, the distance ranging device could be a component of the imaging device, or the imaging device and the distance ranging device could be integrated as a single device configured for distance-range imaging.

Examples of a distance ranging device include a RADAR device and a Light Detection and Ranging (LIDAR) device. A RADAR device operates by detecting a back reflection from a distance object of radio waves or signals emitted by the RADAR device. By measuring a time delay between an emitted signal and the reflected, return signal, a distance to the reflecting object can be determined by dividing one half of the round-trip time delay by the speed of light (possibly adjusted for a medium through which the radio signal travels, such as air). A LIDAR device works in a similar manner, except that it utilizes optical light instead of radio radiation. Other non-limiting examples of a ranging device and/or ranging technique include RF ranging. For example, the aerial vehicle 704 can transmit a RF signal to the ground station 702, which can then measure the LOS distance by determining a propagation delay of the signal.

Both RADAR and LIDAR devices can be configured for imaging by generating an effective spatial array of reflected, return signals distributed across a FOV or a portion of a FOV.

This can be achieved by causing the device (RADAR or LIDAR) to scan across the FOV in each of two dimensions, and then correlating return signals with the scan positions in the FOV of the emitted signals. In this way, the return signals can be associated with array positions, and considered to effectively correspond to image pixels. In addition to distance ranging, a resulting image can provide a three-dimensional image of a distant object (or objects) from which a spatial array of back-reflected signals is received. Each back-reflected signal can be used to determine a distance to a different point on the projected surface of the distant object, and the array of determined distances can thereby yield a three-dimensional relief map of the distant object. In practice, a LIDAR device can provide higher spatial resolution than a RADAR device, because the wavelength of optical radiation (light) is much smaller than that of radio radiation (and spatial resolution is inversely proportional to wavelength).

In accordance with example embodiments, the imaging device, such as imaging device 612, can be an integrated distance-ranging imaging device, such as a LIDAR imaging device. For such an embodiment, the image of an aerial device in an image plane, such as the aerial-vehicle image 704-*i* in the image plane 710, can be a three-dimensional image. Analysis of the image plan data can be the same or similar to that described above, such that a correction to the pointing direction can be determined in terms of pixel offsets in the azimuth and/or elevation directions.

In further accordance with example embodiments, a distance from the ground station 702 to the aerial vehicle 704 (such as D in FIG. 7) can be used to convert an angular offset correction, such as $\Delta Az$ and/or $\Delta El$, into an approximate linear distance. For example, by estimating that $\Delta Az$ and $\Delta El$ correspond to linear distance corrections $\Delta x$ and $\Delta y$, respectively, at a distance D to the aerial vehicle image 704, linear distance corrections can be estimated as $\Delta x \approx D \times \sin(\Delta Az)$ and $\Delta_y \approx D \times \sin(\Delta El)$. Note that for a small angle $\Delta\theta$, $\sin(\Delta\theta) \approx \Delta\theta$.

In the schematic illustration of FIG. 7, the aerial-vehicle image 704-*i* in the image plane 710 is represented as a likeness of the aerial vehicle 704. This can be the case, for example, if the imaging device is a digital optical camera or other optical imaging device. A LIDAR device could similarly yield a three-dimensional relief-map image of the aerial vehicle 704. In practice, automatic analysis of imaging data, such as the data that might represent the aerial-vehicle image 704-*i* in the image plane 710, may entail one or more techniques for recognizing that the aerial vehicle 704 has been imaged (as the aerial-vehicle image 704-*i*) in image plane 710. For example, a pattern recognition technique utilizing a neural network can be used to recognize the image as being that of the aerial vehicle 704. Other techniques can be used as well. Once an image in the image plane 710 is recognized or determined to be an image of the aerial vehicle 704, angular offset analysis can be applied as described above.

In further accordance with example embodiments, an aerial vehicle, such as the aerial vehicle 704, can include one or more identifying markings on its surface that could help enhance the effectiveness and/or reliability of a vehicle image recognition technique. For example, the aerial vehicle can be equipped with one or more LEDs (or other lights) configured for emitting a specific spatial and/or temporal (e.g. blinking) pattern of lights. Further, the imaging device (or an associated processing component) can be configured to recognize the specific pattern in the image plane of the imaging device. In an example embodiment, the imaging device can be a line-scan camera that is synchronized with the specific pattern.

In an example embodiment, one or more reflective strips can be applied to the surface of the aerial vehicle 704 that help enhance reflection of a LIDAR or RADAR signal, such that a back-reflected signal from the one or more reflective strips can be reliably detected and distinguished from other signals that might be detected by a LIDAR or RADAR device. Using such reflective markers can also simplify the task of image recognition. For example, instead of a possibly compute-intensive operation of full pattern recognition for determining that imaging data includes or contains an image of an aerial vehicle (e.g., the aerial-vehicle image 704-*i*), recognition of one or more emitted and/or reflected signals by one or more markings can, by comparison, be simpler task.

In view of the possible use of LEDs and/or reflective markings as described above, terminology such as "an image of an aerial vehicle," or the like, shall be taken herein to include one or more images of a specific pattern of lights (e.g. LEDs), a specific optical (e.g. painted) pattern, and/or a back-reflected signal from one or more reflective markings on an aerial vehicle. More particularly, "an image of an aerial vehicle," or the like, shall be taken to refer to a specific pattern of lights (e.g. LEDs), a specific optical (e.g. painted) pattern, and/or back-reflected signals, in addition to an optical or LIDAR image in a form similar to the representation of the aerial-vehicle image 704-*i* in FIG. 7, or to just the back-reflected signal by itself.

As described above, the pointing direction of a tether termination unit can provide at least an approximate sighting direction to a tethered aerial vehicle during stable flight, such as in cross wind flight. There may be circumstances or instances in which a deviation between the pointing direction and a true, current angular position of an aerial vehicle in the sky exceeds a boundary of the FOV of an image plane of an imaging device. For example, if, during cross wind flight, the wind shifts direction by a significant amount, the aerial vehicle might travel to a location that takes it at least partially, and momentarily, out of the FOV of the imaging device. If and when such a circumstance or instance occurs, image analysis for determining one or more corrections to the pointing direction might be impaired or inoperable, at least temporarily. In order to help mitigate possible effects of such circumstances or instances, the size of the FOV can be configured to be large enough to maintain an aerial vehicle's image within the FOV for a large range of angular deviations between pointing direction and the true angular position of the aerial vehicle in the sky, and over an expected range of operating conditions of the aerial vehicle in tethered flight.

At the same time, for a given number of pixels, the larger the FOV, the lower the angular resolution, and consequently, the lower the precision with which angular corrections may be determined. Conversely, for a given pixel angular resolution, the larger the FOV, the larger the number of pixels, and consequently the more compute-intensive the image analysis may be. In accordance with example embodiments, the FOV size and pixel angular resolution can be configured in manner aimed at optimizing image analysis complexity/compute-intensiveness and precision of determined angular correction.

In further accordance with example embodiments, one or more techniques can be employed to help enhance the accuracy with which the pointing direction tracks the true angular position of a tethered aerial vehicle as it flies. By doing so, deviations between the pointing direction and the true angular position of the flying tethered aerial vehicle be reduced, and thereby reduce the size of the FOV required to maintain the aerial vehicle within the FOV. This, in turn, can help relax some constraints of design optimization. For example, a smaller FOV of the imaging device allows for a smaller number of high-resolution (small) pixels, which, in turn, can reduce complexity and/or intensity of image processing analysis.

In accordance with example embodiments, an imaging device, such the imaging device 612, can be attached to a tether termination unit, or a component of a tether termination unit, that is configured to rotate about the pointing direction in response to twisting and/or de-twisting of a tether along an axial dimension of the tether. With such an arrangement, an image plane of the imaging device can correspondingly rotate about the pointing direction, while maintain a normal orientation to the pointing direction. By such rotation of the image plane in response to twisting and/or de-twisting of the tether, tracking by the pointing direction of the true angular position of a tethered aerial vehicle as it flies can be made more accurate.

Considering again the example ground station 300 of FIG. 3B, an imaging device, such as the imaging device 612 of FIG. 6, could be mounted on, or attached to, the rotatable portion 354B of the slip ring 354. Alternatively, the spindle 356 can be connected to the rotatable portion 354B such that the spindle 356 can rotate (in common with the rotatable portion 354B) about the pointing direction axis. In this configuration, the imaging device could be attached to the spindle 356, as illustrated, for example, in FIG. 6. In either of these example configurations, the image plane of the imaging device can be perpendicular to the pointing direction, and can rotate about the pointing direction as the rotatable portion 354B and/or the spindle 356 rotates about the pointing direction in response to twisting and/or de-twisting of the tether. As discussed above, this rotation of the image plane (FOV) can improve tracking accuracy of the pointing direction, and thereby facilitate use of a smaller FOV than might otherwise be needed to keep a flying tethered vehicle within the FOV.

In accordance with example embodiments, the coordinated functions of tracking an aerial vehicle, such as aerial vehicle 704, via the pointing direction (e.g., by measuring gimbal angles and/or spindle rotation), detecting and/or recognizing an image of the aerial vehicle in the image plane, determining one or more angular corrections from analysis of the aerial vehicle's image in the image plane, determining distance to the aerial vehicle, and applying the angular corrections to the pointing direction in order to obtain an accurate position of the aerial vehicle with respect to a ground station, such as the ground station 702, can be carried out by coordinated actions and/or processing steps of the imaging device and one or more processors with access to various observational data, such as gimbal angles and spindle rotation. In further accordance with example embodiments, the coordinated functions and physical components that carry them out (e.g., the imaging device, processors, etc.) can be considered collectively as a vehicle tracking subsystem of the ground station. It will be appreciated that the vehicle tracking subsystem can take various forms. In an example embodiment, the vehicle tracking subsystem could be integrated as a single device, such as being incorporated as part of the imaging device. In another example embodiment, the vehicle tracking subsystem could be distributed among various components of the ground station (e.g., the imaging device, gimbal encoders, and one or more processors), and organized or configured as an integrated subsystem by executable instructions carried out by the one or more processors. Other architectures of a vehicle tracking subsystem, in accordance with example embodiments, are possible as well.

3. EXAMPLE METHOD

Operation of an example ground station, such as the ground stations 300 or 702, for example, that include an imaging device, such as the imaging device 612, to enhance the accuracy of tracking a flying tethered aerial vehicle, such as aerial vehicles 130, 504, or 704, for example, can be carried out in the form of a method, such as a computer-implemented method. More particularly, in accordance with example embodiments, a method can be implemented by the example ground station (or other apparatus) that cause the ground station to carry out tracking a flying tethered aerial vehicle using the imaging device to enhance accuracy. In accordance with example embodiments, the method could be a computer-implemented method including executable instructions, that when executed by one or more processors of the ground station, cause the ground station to carry out the functional and/or operational aspects of tracking a flying tethered aerial vehicle using the imaging device to enhance accuracy.

In further accordance with example embodiments, the executable instructions can be stored in a non-transient computer readable storage medium. Non-limiting examples of a non-transient computer readable storage medium include magnetic disk, non-volatile solid state memory, DVD, and CDROM. A non-transient computer readable storage medium with the executable instructions store therein can be used, for example during a manufacture of the ground station, to initialize a ground station, and/or as a means for distributing the executable instructions for installation in one or more ground stations.

Figure 8:
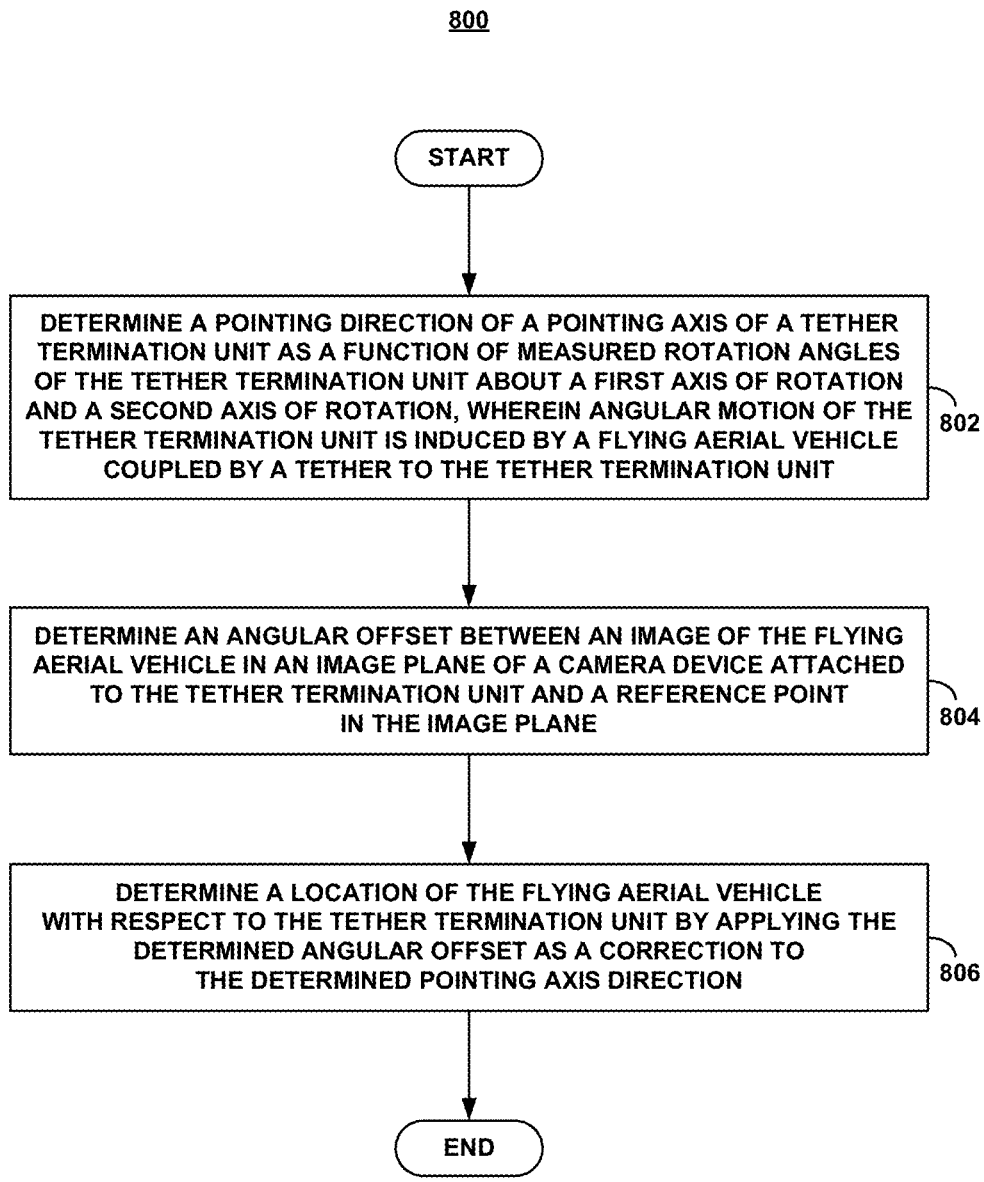
FIG. 8 is a flow chart illustrating an example method of tracking an aerial vehicle, according to an example embodiment.

FIG. 8 is a flow chart illustrating an example method 800 of tracking an aerial vehicle, according to an example embodiment.

At step 802, a pointing direction of a pointing axis of a tether termination unit is determined as a function of measured rotation angles of the tether termination unit about a first axis of rotation and a second axis of rotation. In accordance with example embodiments, the tether termination unit can be configured for terminating a proximal end of a tether that is coupled at a distal end with an aerial vehicle. In further accordance with example embodiments, the pointing axis can be configured for tracking angular motion of the proximal end of the tether induced by flight motion of the aerial vehicle.

At step 804 an angular offset between an image of the aerial vehicle in flight in an image plane of an imaging device attached to the tether termination unit and a reference point in the image plane is determined. In accordance with example embodiments, the image plane can be configured perpendicularly to the pointing axis, and the reference point can correspond to the pointing axis direction in a field-of-view (FOV) of the image plane.

Finally, at step 806, a location of the aerial vehicle in flight with respect to the tether termination unit is determined by applying the determined angular offset as a correction to the determined pointing axis direction.

In accordance with example embodiments, the ground station can include a distance ranging device, and the method can further entail measuring a line-of-sight distance to the aerial vehicle during tethered flight of the aerial vehicle with the distance ranging device. By way of example, the distance ranging device could be a LIDAR device or a RADAR device.

The first axis of rotation can be incorporated in a first gimbal device, and the second axis of rotation can be incorporated in a second gimbal device. In accordance with example embodiments, determining the pointing direction of the pointing axis of the tether termination unit as a function of measured rotation angles of the tether termination unit about the first axis of rotation and the second axis of rotation can then entail measuring a rotation angle of the tether termination unit about the first axis of rotation with a first encoder of the first gimbal device, and measuring a rotation angle of the tether termination unit about the second axis of rotation with a second encoder of the second gimbal device. In further accordance with example embodiments, the first axis of rotation can be orthogonal to the second axis of rotation.

In accordance with example embodiments, determining the pointing direction of the pointing axis of the tether termination unit as a function of measured rotation angles of the tether termination unit about the first axis of rotation and the second axis of rotation can entail tracking angular motion of the proximal end of the tether due to rotation of the tether termination unit about the first and second axes of rotation.

As described above, the tether termination unit could include a spindle through which the tether is physically routed or threaded between the tether termination mount system and the aerial vehicle.

Also as described above, the reference point can be at the center of the image plane, and can correspond to the center of the FOV. In accordance with example embodiments, determining the pointing direction of the pointing axis of the tether termination unit as a function of measured rotation angles of the tether termination unit about the first axis of rotation and the second axis of rotation can entail tracking the aerial vehicle during flight with sufficient accuracy to locate the aerial vehicle within the FOV of the image plane.

In further accordance with example embodiments, the method can further entail rotating the image plane about the pointing axis direction in response to a twisting motion of the proximal end of the tether about the pointing axis.

It will be appreciated that the steps shown in FIG. 8 are meant to illustrate a method in accordance with example embodiments. As such, various steps could be altered or modified, the ordering of certain steps could be changed, and additional steps could be added, while still achieving the overall desired operation.

4. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An apparatus comprising:
   a tether termination mount system comprising a tether termination unit configured for rotation about a first axis of rotation and a second axis of rotation, the first and second axes of rotation being oriented at an angle to one another;
   a tether configured for coupling an aerial vehicle to the tether termination mount system, the tether having a proximal end emanating from the tether termination unit along a pointing axis of the tether termination unit and distal end attached to the aerial vehicle, wherein the pointing axis is configured for tracking angular motion of the proximal end of the tether induced by flight motion of the aerial vehicle;
   an imaging device attached to the tether termination unit and having an image plane oriented at a fixed angle with respect to the pointing axis, and a reference point in the image plane corresponding to the pointing axis direction in a field-of-view (FOV) of the image plane; and
   a vehicle tracking subsystem configured for tracking a location of the aerial vehicle with respect to the tether termination mount system during tethered flight of the aerial vehicle by (i) determining the pointing axis direction as a function of measured rotation angles of the tether termination unit about the first and second axes of rotation, (ii) determining an angular offset between an image of the aerial vehicle in the image plane and the reference point in the image plane, and (iii) applying the determined angular offset as a correction to the determined pointing axis direction.

2. The apparatus of claim 1, wherein the fixed angle is a right angle, whereby the image plane is oriented perpendicularly to the pointing axis.

3. The apparatus of claim 1, wherein the imaging device comprises a device selected from one of a digital camera and a line-scan camera synchronized to a pattern of blinking lights on the aerial vehicle.

4. The apparatus of claim 1, wherein the image of the aerial vehicle in the image plane is at least one of an optical image of a physical form of the aerial vehicle, an optical image of a pattern painted on the aerial vehicle, an optical image of a pattern of lights emitted from the aerial vehicle, or a signal reflected from a surface pattern on the aerial vehicle.

5. The apparatus of claim 1, wherein the vehicle tracking subsystem is further configured for tracking the location of the aerial vehicle with respect to the tether termination mount system during tethered flight of the aerial vehicle by measuring the line-of-sight distance to the aerial vehicle during tethered flight of the aerial vehicle.

6. The apparatus of claim 1, further comprising a distance ranging device configured for measuring a line-of-sight distance to the aerial vehicle,
   and wherein the vehicle tracking subsystem is further configured for tracking the location of the aerial vehicle with respect to the tether termination mount system during tethered flight of the aerial vehicle by measuring the line-of-sight distance to the aerial vehicle during tethered flight of the aerial vehicle with the distance ranging device.

7. The apparatus of claim 6, wherein the distance ranging device is one of a LIDAR device or a RADAR device.

8. The apparatus of claim 6, wherein the imaging device and the distance ranging device are configured as integral components of a single distance-imaging device.

9. The apparatus of claim 1, wherein the first axis of rotation is incorporated in a first gimbal device, and the second axis of rotation is incorporated in a second gimbal device,
   wherein the first gimbal device comprises a first encoder configured for measuring a rotation angle of the tether termination unit about the first axis of rotation,
   and wherein the second gimbal device comprises a second encoder configured for measuring a rotation angle of the tether termination unit about the second axis of rotation.

10. The apparatus of claim 1, wherein the first axis of rotation is orthogonal to the second axis of rotation.

11. The apparatus of claim 1, wherein the pointing axis is configured for tracking angular motion of the proximal end of the tether due to rotation of the tether termination unit about the first and second axes of rotation.

12. The apparatus of claim 1, wherein the tether termination unit comprises a spindle through which the tether is physically routed between the tether termination mount system and the aerial vehicle.

13. The apparatus of claim 1, wherein the reference point is at the center of the image plane, and further corresponds to the center of the FOV.

14. The apparatus of claim 1, wherein tracking the angular motion of the proximal end of the tether induced by flight motion of the aerial vehicle comprises tracking the aerial vehicle during flight with sufficient accuracy to locate the aerial vehicle within the FOV of the image plane.

15. The apparatus of claim 1, wherein the image plane is configured for rotation about the pointing axis direction in response to a twisting motion of the proximal end of the tether about the pointing axis.

16. A method comprising:
flying an aerial vehicle at a distal end of a tether;
determining a pointing direction of a pointing axis of a tether termination unit as a function of measured rotation angles of the tether termination unit about a first axis of rotation and a second axis of rotation, wherein the tether termination unit is configured for terminating a proximal end of the tether that is coupled at the distal end with the aerial vehicle, and wherein the pointing axis is configured for tracking angular motion of the proximal end of the tether induced by flight motion of the aerial vehicle;
determining an angular offset between an image of the aerial vehicle in flight in an image plane of an imaging device attached to the tether termination unit and a reference point in the image plane, wherein the image plane is configured at a fixed angle with respect to the pointing axis, and the reference point corresponds to the pointing axis direction in a field-of-view (FOV) of the image plane; and
determining a location of the aerial vehicle in flight with respect to the tether termination unit by applying the determined angular offset as a correction to the determined pointing axis direction.

17. The method of claim 16, wherein the fixed angle is a right angle, whereby the image plane is oriented perpendicularly to the pointing axis.

18. The method of claim 16, wherein the image of the aerial vehicle in the image plane is at least one of an optical image of a physical form of the aerial vehicle, an optical image of a pattern painted on the aerial vehicle, an optical image of a pattern of lights emitted from the aerial vehicle, or a signal reflected from a surface pattern on the aerial vehicle.

19. The method of claim 16, further comprising measuring a line-of-sight distance to the aerial vehicle during tethered flight of the aerial vehicle.

20. The method of claim 19, wherein the tether termination unit is a component of an apparatus that further comprises a distance ranging device select from one of a LIDAR device and a RADAR device,
and wherein measuring the line-of-sight distance to the aerial vehicle during tethered flight of the aerial vehicle comprises measuring the line-of-sight distance to the aerial vehicle during tethered flight of the aerial vehicle with the distance ranging device.

21. The method of claim 16, wherein the first axis of rotation is incorporated in a first gimbal device, and the second axis of rotation is incorporated in a second gimbal device,
and wherein determining the pointing direction of the pointing axis of the tether termination unit as a function of measured rotation angles of the tether termination unit about the first axis of rotation and the second axis of rotation comprises:
measuring a rotation angle of the tether termination unit about the first axis of rotation with a first encoder of the first gimbal device; and
measuring a rotation angle of the tether termination unit about the second axis of rotation with a second encoder of the second gimbal device.

22. The method of claim 16, wherein the first axis of rotation is orthogonal to the second axis of rotation.

23. The method of claim 16, determining the pointing direction of the pointing axis of the tether termination unit as a function of measured rotation angles of the tether termination unit about the first axis of rotation and the second axis of rotation comprises tracking angular motion of the proximal end of the tether due to rotation of the tether termination unit about the first and second axes of rotation.

24. The method of claim 16, wherein the tether termination unit comprises a spindle through which the tether is physically routed between the tether termination mount system and the aerial vehicle.

25. The method of claim 16, wherein the reference point is at the center of the image plane, and further corresponds to the center of the FOV.

26. The method of claim 16, wherein determining the pointing direction of the pointing axis of the tether termination unit as a function of measured rotation angles of the tether termination unit about the first axis of rotation and the second axis of rotation comprises tracking the aerial vehicle during flight with sufficient accuracy to locate the aerial vehicle within the FOV of the image plane.

27. The method of claim 16, further comprising rotating the image plane about the pointing axis direction in response to a twisting motion of the proximal end of the tether about the pointing axis.

28. A non-transient computer-readable storage medium having stored therein instructions, that when executed by one or more processors of an apparatus comprising a tether termination unit, cause the apparatus to perform functions comprising:
flying an aerial vehicle at a distal end of a tether;
determining a pointing direction of a pointing axis of the tether termination unit as a function of measured rotation angles of the tether termination unit about a first axis of rotation and a second axis of rotation, wherein the tether termination unit is configured for terminating a proximal end of the tether that is coupled at the distal end with the aerial vehicle, and wherein the pointing axis is configured for tracking angular motion of the proximal end of the tether induced by flight motion of the aerial vehicle;
determining an angular offset between an image of the aerial vehicle in flight in an image plane of an imaging device attached to the tether termination unit and a reference point in the image plane, wherein the image plane is configured at a fixed angle with respect to the pointing axis, and the reference point corresponds to the pointing axis direction in a field-of-view (FOV) of the image plane; and
determining a location of the aerial vehicle in flight with respect to the tether termination unit by applying the determined angular offset as a correction to the determined pointing axis direction.

29. The non-transient computer-readable storage medium of claim 28, wherein the fixed angle is a right angle, whereby the image plane is oriented perpendicularly to the pointing axis.

30. The non-transient computer-readable storage medium of claim 28, wherein the imaging device comprises a device selected from one of a digital camera and a line-scan camera synchronized to a pattern of blinking lights on the aerial vehicle.

31. The non-transient computer-readable storage medium of claim 28, wherein the image of the aerial vehicle in the image plane is at least one of an optical image of a physical form of the aerial vehicle, an optical image of a pattern painted on the aerial vehicle, an optical image of a pattern of lights emitted from the aerial vehicle, or a signal reflected from a surface pattern on the aerial vehicle.

32. The non-transient computer-readable storage medium of claim 28, the functions further comprise measuring a line-of-sight distance to the aerial vehicle during tethered flight of the aerial vehicle.

33. The non-transient computer-readable storage medium of claim 32, wherein the apparatus further comprises a distance ranging device select from one of a LIDAR device and a RADAR device, and wherein measuring the line-of-sight distance to the aerial vehicle during tethered flight of the aerial vehicle comprises measuring the line-of-sight distance to the aerial vehicle during tethered flight of the aerial vehicle with the distance ranging device.

34. The non-transient computer-readable storage medium of claim 32, wherein the imaging device and the distance ranging device are configured as integral components of a single distance-imaging device.

35. The non-transient computer-readable storage medium of claim 28, wherein the first axis of rotation is incorporated in a first gimbal device, and the second axis of rotation is incorporated in a second gimbal device, and wherein determining the pointing direction of the pointing axis of the tether termination unit as a function of measured rotation angles of the tether termination unit about the first axis of rotation and the second axis of rotation comprises:

measuring a rotation angle of the tether termination unit about the first axis of rotation with a first encoder of the first gimbal device; and measuring a rotation angle of the tether termination unit about the second axis of rotation with a second encoder of the second gimbal device.

36. The non-transient computer-readable storage medium of claim 28, wherein the first axis of rotation is orthogonal to the second axis of rotation.

37. The non-transient computer-readable storage medium of claim 28, determining the pointing direction of the pointing axis of the tether termination unit as a function of measured rotation angles of the tether termination unit about the first axis of rotation and the second axis of rotation comprises tracking angular motion of the proximal end of the tether due to rotation of the tether termination unit about the first and second axes of rotation.

38. The non-transient computer-readable storage medium of claim 28, wherein the reference point is at the center of the image plane, and further corresponds to the center of the FOV.

39. The non-transient computer-readable storage medium of claim 28, wherein determining the pointing direction of the pointing axis of the tether termination unit as a function of measured rotation angles of the tether termination unit about the first axis of rotation and the second axis of rotation comprises tracking the aerial vehicle during flight with sufficient accuracy to locate the aerial vehicle within the FOV of the image plane.

40. The non-transient computer-readable storage medium of claim 28, wherein the functions further comprise rotating the image plane about the pointing axis direction in response to a twisting motion of the proximal end of the tether about the pointing axis.

* * * * *